(12) United States Patent
Yang et al.

(10) Patent No.: US 9,919,699 B2
(45) Date of Patent: Mar. 20, 2018

(54) VEHICLE AND METHOD FOR CONTROLLING SYNCHRONIZER OF THE SAME

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/527,410

(22) Filed: Oct. 29, 2014

(65) Prior Publication Data

US 2015/0210268 A1 Jul. 30, 2015

(30) Foreign Application Priority Data

Jan. 30, 2014 (CN) .......................... 2014 1 0044574
Mar. 10, 2014 (CN) .......................... 2014 1 0086099

(51) Int. Cl.
*B60W 20/00* (2016.01)
*B60W 20/20* (2016.01)
(Continued)

(52) U.S. Cl.
CPC ............. *B60W 20/20* (2013.01); *B60K 6/387* (2013.01); *B60K 6/442* (2013.01); *B60K 6/52* (2013.01);
(Continued)

(58) Field of Classification Search
None
See application file for complete search history.

(56) References Cited

U.S. PATENT DOCUMENTS 4,132,133 A 1/1979 Ballendux
4,610,177 A 9/1986 Mahoney
(Continued)

FOREIGN PATENT DOCUMENTS

CN 2602978 Y 2/2004
CN 1618644 A 5/2005
(Continued)

OTHER PUBLICATIONS

Chinese Search Report dated May 26, 2015, issued in related Chinese Application No. 201510024072.4 (7 pages).
(Continued)

*Primary Examiner* — Lail A Kleinman

(57) ABSTRACT

A method for controlling a synchronizer of a vehicle is provided. The vehicle comprises an engine unit, a transmission unit configured to selectively couple with the engine unit and to couple with at least one of a plurality of wheels of the vehicle, a synchronizer configured to adjust a power transmission between the transmission unit and the wheels. The method comprises acquiring an operation mode and operation parameters of the vehicle and controlling the synchronizer to adjust the power transmission between the transmission unit and the wheels based on the operation parameters. A vehicle including a controller configured to control the synchronizer according to the method is also provided. The vehicle further includes a first motor generator configured to adjust a rotating speed of the synchronizer according to a speed of the vehicle, and a second motor generator configured to drive at least one of wheels of the vehicle.

20 Claims, 16 Drawing Sheets

(51) Int. Cl.

| | | |
|---|---|---|
| *B60K 6/387* | (2007.10) | |
| *B60K 6/442* | (2007.10) | |
| *B60K 6/52* | (2007.10) | |
| *B60W 10/02* | (2006.01) | |
| *B60W 10/08* | (2006.01) | |
| *B60W 10/113* | (2012.01) | |
| *B60W 20/40* | (2016.01) | |
| *B60K 7/00* | (2006.01) | |
| *B60K 17/356* | (2006.01) | |
| *F16H 37/06* | (2006.01) | |

(52) U.S. Cl.
CPC .......... *B60K 7/0007* (2013.01); *B60K 17/356* (2013.01); *B60W 10/02* (2013.01); *B60W 10/08* (2013.01); *B60W 10/113* (2013.01); *B60W 20/40* (2013.01); *F16H 37/065* (2013.01); *Y02T 10/6234* (2013.01); *Y02T 10/6265* (2013.01); *Y10S 903/93* (2013.01); *Y10T 74/19014* (2015.01); *Y10T 477/328* (2015.01)

(56) References Cited

U.S. PATENT DOCUMENTS

| | | | |
|---|---|---|---|
| 4,676,115 A | 6/1987 | Morscheck et al. | |
| 5,081,365 A | 1/1992 | Field et al. | |
| 5,586,613 A | 12/1996 | Ehsani | |
| 5,890,392 A | 4/1999 | Ludanek et al. | |
| 6,120,115 A | 9/2000 | Manabe et al. | |
| 6,364,434 B1 | 2/2002 | Sway-Tin et al. | |
| 6,634,247 B2 | 10/2003 | Pels | |
| 7,296,648 B2 | 11/2007 | Tatara et al. | |
| 7,383,749 B2 | 6/2008 | Schafer et al. | |
| 7,395,889 B2 | 7/2008 | Sugiyama et al. | |
| 7,428,852 B2 | 9/2008 | Baldwin et al. | |
| 7,437,966 B2 | 10/2008 | Maillard et al. | |
| 7,730,982 B2 | 6/2010 | Hidaka et al. | |
| 7,987,739 B2 | 8/2011 | Okadome et al. | |
| 8,297,141 B2 | 10/2012 | Cimatti | |
| 8,505,400 B2 | 8/2013 | Mellet et al. | |
| 8,523,734 B2 | 9/2013 | Mepham et al. | |
| 8,579,059 B2 | 11/2013 | Teraya | |
| 8,608,615 B2 | 12/2013 | Fuechtner et al. | |
| 8,887,588 B2 | 11/2014 | Koyama et al. | |
| 8,931,371 B2 | 1/2015 | Xie et al. | |
| 9,145,951 B2 | 3/2015 | Lee et al. | |
| 9,003,907 B2 | 4/2015 | Weller et al. | |
| 9,341,239 B2 | 5/2016 | Lee et al. | |
| 9,568,066 B2 | 2/2017 | Yang et al. | |
| 2002/0088291 A1 | 7/2002 | Bowen | |
| 2002/0177504 A1 | 11/2002 | Pels et al. | |
| 2003/0078134 A1 | 4/2003 | Kojima et al. | |
| 2003/0184147 A1 | 10/2003 | Perach et al. | |
| 2004/0204286 A1 | 10/2004 | Stridsberg | |
| 2005/0241437 A1 | 11/2005 | Gray, Jr. et al. | |
| 2005/0139035 A1 | 12/2005 | Mcmurry et al. | |
| 2006/0048516 A1 | 3/2006 | Tenbrock et al. | |
| 2006/0175103 A1 | 8/2006 | Iida et al. | |
| 2007/0028718 A1* | 2/2007 | Lee ..................... B60K 6/36 74/661 | |
| 2007/0102211 A1* | 5/2007 | Nozaki ................ B60K 6/48 180/65.7 | |
| 2007/0175723 A1 | 8/2007 | Blessing et al. | |
| 2007/0266810 A1 | 11/2007 | Forsyth | |
| 2007/0272457 A1 | 11/2007 | Kodama et al. | |
| 2008/0070745 A1 | 3/2008 | Ogata | |
| 2008/0099305 A1 | 5/2008 | Ogasawara | |
| 2008/0134819 A1 | 6/2008 | Kapp et al. | |
| 2008/0202267 A1 | 8/2008 | Hendrickson et al. | |
| 2009/0145673 A1 | 6/2009 | Soliman et al. | |
| 2010/0031910 A1 | 2/2010 | Seufert et al. | |
| 2010/0076657 A1 | 3/2010 | Jinno et al. | |
| 2010/0120580 A1 | 5/2010 | Mepham et al. | |
| 2010/0320016 A1 | 12/2010 | Wang et al. | |
| 2011/0098151 A1 | 4/2011 | Ziemer | |
| 2011/0113923 A1 | 5/2011 | Pesola et al. | |
| 2011/0245033 A1* | 10/2011 | Sato ..................... B60K 6/442 477/3 |
| 2011/0263379 A1 | 10/2011 | Liang et al. | |
| 2011/0265601 A1 | 11/2011 | Pastorello et al. | |
| 2012/0010041 A1 | 1/2012 | Soliman et al. | |
| 2012/0053011 A1 | 3/2012 | Onomura et al. | |
| 2012/0160044 A1 | 6/2012 | Kahl | |
| 2012/0245781 A1 | 9/2012 | Kanamori et al. | |
| 2012/0245783 A1 | 9/2012 | Tamagawa | |
| 2012/0303201 A1* | 11/2012 | Tsuneishi ............. B60K 6/547 701/22 |
| 2012/0310461 A1* | 12/2012 | Maruyama ........... B60K 6/445 701/22 |
| 2012/0325048 A1 | 12/2012 | Ralsch | |
| 2012/0325573 A1 | 12/2012 | Miller | |
| 2013/0068056 A1 | 3/2013 | Van Batavia et al. | |
| 2013/0090202 A1 | 4/2013 | Hiraiwa | |
| 2013/0096749 A1 | 4/2013 | Hussain et al. | |
| 2013/0096784 A1 | 4/2013 | Kohler et al. | |
| 2013/0166118 A1 | 6/2013 | Kim | |
| 2013/0192417 A1 | 8/2013 | Fujita et al. | |
| 2013/0231848 A1 | 9/2013 | Roberts et al. | |
| 2013/0288854 A1 | 10/2013 | Kobayashi | |
| 2013/0345019 A1 | 12/2013 | Kaltenbach et al. | |
| 2014/0128205 A1 | 5/2014 | Phillips et al. | |
| 2015/0167786 A1 | 6/2015 | Kim | |
| 2015/0167803 A1 | 6/2015 | Lee et al. | |
| 2015/0291154 A1 | 10/2015 | Kaltenbach et al. | |
| 2016/0084351 A1 | 3/2016 | Lee et al. | |
| 2016/0298733 A1 | 10/2016 | Helmut et al. | |

FOREIGN PATENT DOCUMENTS

| | | |
|---|---|---|
| CN | 1637327 A | 7/2005 |
| CN | 1699091 A | 11/2005 |
| CN | 1728192 A | 2/2006 |
| CN | 1275790 C | 9/2006 |
| CN | 1876460 A | 12/2006 |
| CN | 101209675 A | 7/2008 |
| CN | 101219662 A | 7/2008 |
| CN | 101380887 A | 3/2009 |
| CN | 101400536 A | 4/2009 |
| CN | 201214410 Y | 4/2009 |
| CN | 101450609 A | 6/2009 |
| CN | 101516708 A | 8/2009 |
| CN | 101549634 A | 10/2009 |
| CN | 201390137 Y | 1/2010 |
| CN | 101659203 A | 3/2010 |
| CN | 201511806 U | 6/2010 |
| CN | 101973207 A | 2/2011 |
| CN | 101983150 A | 3/2011 |
| CN | 102009587 A | 4/2011 |
| CN | 201907400 U | 7/2011 |
| CN | 102166962 | 8/2011 |
| CN | 102259583 A | 11/2011 |
| CN | 102259584 A | 11/2011 |
| CN | 102203517 A | 1/2012 |
| CN | 102343824 | 2/2012 |
| CN | 102371893 A | 3/2012 |
| CN | 102381178 | 3/2012 |
| CN | 102381178 A | 3/2012 |
| CN | 202242966 U | 5/2012 |
| CN | 102490588 A | 6/2012 |
| CN | 202319954 U | 7/2012 |
| CN | 202345366 U | 7/2012 |
| CN | 101450608 B | 9/2012 |
| CN | 102666169 A | 9/2012 |
| CN | 102673365 A | 9/2012 |
| CN | 102673382 A | 9/2012 |
| CN | 102678839 A | 9/2012 |
| CN | 102678871 A | 9/2012 |
| CN | 202429065 U | 9/2012 |
| CN | 102717714 | 10/2012 |
| CN | 102781698 A | 11/2012 |
| CN | 202641355 U | 1/2013 |
| CN | 202641405 | 1/2013 |

(56) References Cited

FOREIGN PATENT DOCUMENTS

| | | |
|---|---|---|
| CN | 202656855 U | 1/2013 |
| CN | 102910066 A | 2/2013 |
| CN | 102951005 A | 3/2013 |
| CN | 102975607 A | 3/2013 |
| CN | 103029558 A | 4/2013 |
| CN | 103144528 A | 6/2013 |
| CN | 103332102 A | 10/2013 |
| CN | 203283020 U | 11/2013 |
| CN | 203305832 U | 11/2013 |
| CN | 103527726 A | 1/2014 |
| CN | 103697118 A | 4/2014 |
| CN | 203516615 U | 4/2014 |
| CN | 103832263 A | 6/2014 |
| CN | 103867657 A | 6/2014 |
| CN | 103912640 A | 7/2014 |
| CN | 103921674 A | 7/2014 |
| CN | 203876574 U | 10/2014 |
| CN | 203962884 U | 11/2014 |
| CN | 102555769 B | 12/2014 |
| CN | 204095490 U | 1/2015 |
| DE | 10239540 A1 | 3/2004 |
| DE | 102008002381 A1 | 12/2009 |
| DE | 102011115780 A1 | 4/2012 |
| DE | 102011086743 A1 | 5/2013 |
| DE | 102011089467 A1 | 6/2013 |
| DE | 102012222122 A1 | 6/2014 |
| DE | 102013201744 A1 | 8/2014 |
| EP | 1122109 A2 | 8/2001 |
| EP | 1375241 | 2/2004 |
| EP | 1555184 | 7/2005 |
| EP | 1979185 | 10/2008 |
| EP | 1990229 A2 | 12/2008 |
| EP | 2080682 | 7/2009 |
| EP | 2133252 | 12/2009 |
| EP | 2210758 A1 | 7/2010 |
| EP | 2255986 A1 | 12/2010 |
| EP | 2279922 A1 | 2/2011 |
| EP | 2385270 A1 | 11/2011 |
| EP | 2390127 A1 | 11/2011 |
| EP | 2439094 A1 | 4/2012 |
| EP | 2460704 | 6/2012 |
| EP | 2474434 A1 | 7/2012 |
| EP | 2508378 A1 | 10/2012 |
| EP | 2517938 A1 | 10/2012 |
| EP | 2631103 | 8/2013 |
| EP | 2636554 | 9/2013 |
| EP | 2636566 | 9/2013 |
| EP | 2636567 | 9/2013 |
| EP | 2641802 A2 | 9/2013 |
| EP | 2738030 A2 | 6/2014 |
| EP | 2995477 | 3/2016 |
| EP | 2995487 | 3/2016 |
| JP | H0993714 A | 4/1997 |
| JP | 2001157305 | 6/2001 |
| JP | 2001191814 | 7/2001 |
| JP | 2005133682 | 5/2005 |
| JP | 2010070188 A | 4/2010 |
| JP | 2010076761 A | 4/2010 |
| JP | 2010179789 | 8/2010 |
| JP | 2010281237 | 12/2010 |
| JP | 2012086701 | 5/2012 |
| JP | 2013-126365 A | 6/2013 |
| JP | 2013199909 | 10/2013 |
| JP | 2013-240166 A | 11/2013 |
| KR | 101339264 | 12/2013 |
| WO | WO 99/21263 A2 | 4/1999 |
| WO | WO 2008/092353 A1 | 8/2008 |
| WO | WO 2010/054210 A1 | 5/2010 |
| WO | 2011138308 A1 | 11/2011 |
| WO | 2012152613 | 11/2012 |
| WO | WO 2013/014510 A1 | 1/2013 |
| WO | WO 2013/031491 A1 | 3/2013 |
| WO | 2015032346 | 3/2015 |

OTHER PUBLICATIONS

Chinese Search Report dated May 26, 2015, issued in related Chinese Application No. 201510024073.9 (7 pages).
Chinese Search Report dated May 26, 2015, issued in related Chinese Application No. 201510024171.2 (7 pages).
Chinese Search Report dated May 26, 2015, issued in related Chinese Application No. 201510024172.7 (7 pages).
Chinese Search Report dated May 26, 2015, issued in related Chinese Application No. 201510024198.1 (7 pages).
Chinese Search Report dated May 27, 2015, issued in related Chinese Application No. 201510024215.1 (8 pages).
Chinese Search Report dated May 27, 2015, issued in related Chinese Application No. 201510024314.X (8 pages).
PCT International Search Report dated Jan. 16, 2015, issued in related International Application No. PCT/CN2014/089831 (15 pages).
PCT International Search Report dated Jan. 19, 2015, issued in related International Application No. PCT/CN2014/089840 (15 pages).
PCT International Search Report dated Jan. 21, 2015, issued in related International Application No. PCT/CN2014/089837 (14 pages).
PCT International Search Report dated Jan. 21, 2015, issued in related International Application No. PCT/CN2014/089846 (14 pages).
PCT International Search Report dated Jan. 21, 2015, issued in related International Application No. PCT/CN2014/089847 (13 pages).
PCT International Search Report dated Jan. 26, 2015, issued in related International Application No. PCT/CN2014/089841 (14 pages).
PCT International Search Report dated Jan. 28, 2015, issued in related International Application No. PCT/CN2014/089829 (14 pages).
PCT International Search Report dated Jan. 28, 2015, issued in related International Application No. PCT/CN2014/089836 (14 pages).
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
Notice of Allowance dated Oct. 19, 2016, issued in related U.S. Appl. No. 14/527,446 (7 pages).
Final Office Action dated Oct. 20, 2016, issued in related U.S. Appl. No. 14/527,496 (8 pages).
Notice of Allowance dated Oct. 26, 2016, issued in related U.S. Appl. No. 14/527,600 (19 pages).
Notice of Allowance dated Nov. 1, 2016, issued in related U.S. Appl. No. 14/644,943 (8 pages).
Notice of Allowance dated Nov. 4, 2016, issued in related U.S. Appl. No. 14/527,496 (8 pages).
Notice of Allowance dated Nov. 4, 2016, issued in related U.S. Appl. No. 14/644,818 (7 pages).
Non-Final Office Action for U.S. Appl. No. 14/527,522, dated Aug. 7, 2017, 11 pages.
Non-Final Office Action for U.S. Appl. No. 14/527,572, dated Aug. 23, 2017, 31 pages.
Final Office Action for U.S. Appl. No. 14/755,540, dated Sep. 19, 2017, 10 pages.

(56) References Cited

OTHER PUBLICATIONS

Extended European Search Report dated Jun. 29, 2016, issued in related European Patent Application No. 15158699.7 (8 pages).
Final Office Action dated Jun. 17, 2016, issued in related U.S. Appl. No. 14/527,600 (19 pages).
Non-Final Office Action for U.S. Appl. No. 14/755,540, dated Jan. 26, 2017, 15 pages.
European Search Report and Written Opinion for Application No. 14880411.5, dated Apr. 11, 2017, 12 pages.
Non-Final Office Action for U.S. Appl. No. 14/755,695, dated May 4, 2017, 6 pages.
European Search Report and Written Opinion for Application No. 14881104.5, dated May 5, 2017, 8 pages.
Non-Final Office Action for U.S. Appl. No. 14/755,775, dated May 10, 2017, 9 pages.
Non-Final Office Action for U.S. Appl. No. 14/755,629, dated May 17, 2017, 6 pages.
Non-Final Office Action for U.S. Appl. No. 14/644,881, dated May 19, 2017, 29 pages.
Final Office Action for U.S. Appl. No. 14/755,540, dated May 24, 2017, 11 pages.

* cited by examiner

VEHICLE AND METHOD FOR CONTROLLING SYNCHRONIZER OF THE SAME

CROSS-REFERENCE TO RELATED APPLICATION

This application claims priority to and benefits of Chinese Patent Application No. 201410044574.9, filed with the State Intellectual Property Office of P. R. China on Jan. 30, 2014, and Chinese Patent Application No. 201410086099.1, filed with the State Intellectual Property Office of P. R. China on Mar. 10, 2014. The entire content of the above-identified applications is incorporated herein by reference.

FIELD

The present disclosure relates to the field of vehicle, and more particularly to a vehicle and a method for controlling a synchronizer of the vehicle.

BACKGROUND

To reduce energy consumption, development and utilization of energy-efficient vehicles have become a trend. As an energy-efficient vehicle, a hybrid vehicle is driven by at least one of an internal combustion engine and a motor and has various operation modes, and consequently may operate with improved transmission efficiency and fuel economic efficiency.

However, in the related art, the power transmission system in the hybrid vehicle is generally complex in structure, bulky, low in transmission efficiency, and complicated in control strategy. For example, a plurality of gear shift actuating elements needs to be controlled simultaneously during the gear shifting or mode switching.

SUMMARY

Embodiments of the present disclosure seek to solve at least one of the problems existing in the related art to at least some extent.

Embodiments of the present disclosure provide a method for controlling a synchronizer of a vehicle. The vehicle includes an engine unit, a transmission unit configured to be selectively coupled with the engine unit, an output unit configured to transmit power transmitted by the transmission unit to at least one of front and rear wheels of the vehicle, a synchronizer configured to enable or interrupt power transmission between the transmission unit and the output unit and to selectively synchronize the output unit and the transmission unit, a first motor generator coupled with the transmission unit and configured to adjust a rotating speed of an output shaft coupled with the synchronizer according to a speed of the vehicle, a second motor generator configured to drive at least one of the front and rear wheels, and a power battery coupled with the first and second motor generators respectively. The control method includes: acquiring an operation mode and operation parameters of the vehicle; and controlling the synchronizer to engage or to disengage based on the operation parameters.

Embodiments of the present disclosure provide a method for controlling a synchronizer of a vehicle. The vehicle includes an engine unit, a transmission unit configured to selectively couple with the engine unit, an output unit configured to transmit a power transmitted by the transmission unit to at least one of front and rear wheels of the vehicle, a synchronizer configured to adjust a power transmission between the transmission unit and the output unit and to selectively synchronize the output unit and the transmission unit. The control method includes: acquiring information on operation parameters of the vehicle; and controlling the synchronizer to adjust the power transmission between the transmission unit and the wheels based on the operation parameters.

Embodiments of the present disclosure further provide a vehicle. The vehicle includes: an engine unit, a plurality of wheels, a transmission unit configured to selectively couple with the engine unit, an output unit configured to transmit a power transmitted by the transmission unit to at least one of the wheels of the vehicle, a synchronizer configured to adjust a power transmission between the transmission unit and the output unit, a first motor generator coupled with the transmission unit and configured to adjust a speed of the vehicle, a second motor generator configured to drive the at least one of the wheels of the vehicle, a power battery coupled with the first and second motor generators respectively, and a controller configured to acquire an operation mode and operation parameters of the vehicle, and to control the synchronizer to adjust the power transmission based on the operation parameters.

With the vehicle and the method for controlling a synchronizer of a vehicle according to embodiments of the present disclosure, the power output by at least one of the engine unit and the first motor generator may be output to the output unit via the synchronizer, and then output by the output unit to at least one of the wheels of the vehicle.

Besides, the second motor generator may also compensate for the torque of the front wheels or the rear wheels, and may also cooperate with the engine unit and the first motor generator to drive the vehicle, thus increasing the number of operation modes of the vehicle. Therefore, the vehicle may be configured to different operating conditions and can achieve enhanced fuel economy and reduced emission of harmful gases. In addition, with the control methods of the synchronizer according to embodiments of the present disclosure, the vehicle may run more smoothly and stably. The noise and impact during the operation of the synchronizer may be reduced, and thus the life of the transmission unit can be lengthened.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
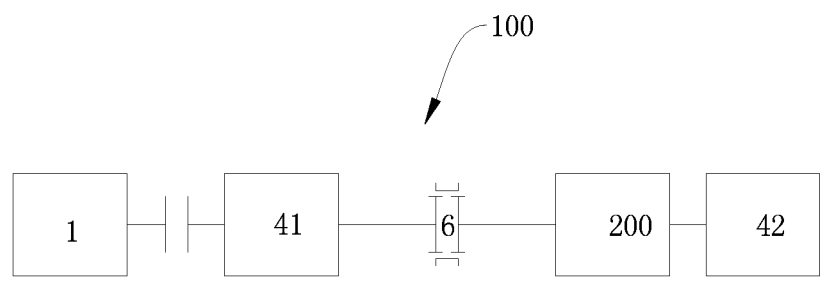
FIG. 1 is a schematic diagram of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two this features, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Embodiments of the present disclosure propose a vehicle and a method for controlling a synchronizer of the vehicle.

In order to have a better understanding of the vehicle and the method for controlling the synchronizer of the vehicle according to embodiments of the present disclosure, a power transmission system of the vehicle is first described.

A power transmission system 100 according to embodiments of the present disclosure will be described in detail below with reference to FIGS. 1-19. The power transmission system 100 is applicable to a vehicle, such as a hybrid vehicle with an engine unit 1 and a motor generator.

As shown in FIGS. 1-2 and 18-19, the power transmission system 100 according to embodiments of the present disclosure may include an engine unit 1, a transmission unit 2a, a first motor generator 41, a second motor generator 42, an output unit 5 and a power switching device (e.g., a synchronizer 6, a clutch 9).

The transmission unit 2a is configured to selectively power-couple with the engine unit 1. The engine unit 1 may selectively output a power generated by the engine unit 1 to the transmission unit 2a via the clutch 9. Alternatively, the transmission unit 2a may also output, for example, a starting torque from the first motor generator 41 to the engine unit 1, so as to start the engine unit 1. In the context of the present disclosure, the phase "the transmission unit 2a is 'power-coupled' with the engine unit 1" means that the power can be transferred between the engine unit 1 and the transmission unit 2a directly or via other components, and that the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may adopt a four-stroke gasoline or diesel engine. The engine unit 1 may generally include a block, a crank-connecting rod mechanism, a valve mechanism, a supply system, an ignition system, a cooling system, a lubrication system and the like.

The block of engine unit 1 can be an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the engine unit 1 as well as structures and operation principles of individual sub-systems and sub-mechanisms of the engine unit 1 are well known to those skilled in the art, so the detailed description thereof will be omitted here for clarity purpose.

The first motor generator 41 is power-coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thereby to the first motor generator 41 via the transmission unit 2a, and the first motor generator 41 may generate electricity and convert mechanical energy into electric energy to be stored in an energy storage component such as a battery pack. As another example, the first motor generator 41 may convert electric energy from the battery pack into mechanical energy, and output the mechanical energy to the output unit 5 via the transmission unit 2a to drive the vehicle.

The first motor generator 41 is a motor having functions of both a motor and a generator. As used herein, the term "motor generator" refers to a motor having functions of both a motor and a generator, unless specified otherwise.

The output unit 5 is configured to transfer a power transmitted by the transmission unit 2a to wheels 200 (e.g. one of front and rear wheels 210 and 220) of the vehicle. In short, the output unit 5 is configured to output the power from the transmission unit 2a.

The power switching device such as the synchronizer 6 is configured to enable or interrupt a power transmission between the output unit 5 and the transmission unit 2a. In other words, the power switching device may output the power output from the transmission unit 2a to at least one of front and rear wheels 210, 220 via the output unit 5, or the power switching device may also disconnect the transmission unit 2a from the output unit 5 and the transmission unit 2a may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present disclosure, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the number of operation modes of the vehicle. Therefore, the vehicle may be configured to different operating conditions, thus achieving better fuel economic efficiency while reducing the emission of harmful gases.

In some embodiments, as shown in FIGS. 1-16, the power switching device is configured as a synchronizer 6, and the synchronizer 6 is configured to selectively synchronize the output unit 5 with the transmission unit 2a, so as to output the power via the output unit 5 to drive the wheels 200 of the vehicle.

Here, the function of the synchronizer 6 may be to synchronize the output unit 5 with the transmission unit 2a, i.e. under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

In short, the synchronizer 6 functions to switch the power. That is, when the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Compared to a clutch, the synchronizer 6 has the following advantages.

When the synchronizer 6 is in a disengaged state, the power transmission between the engine unit 1, the transmission unit 2a, the first motor generator 41 and the wheels 200 can be severed, such that operations such as electricity generation, driving, and power/torque transmission may not influence each other, which is very important in reducing the energy consumption of the vehicle. The synchronizer 6 may meet this requirement well while incomplete separation of friction plates usually occurs in the clutch, thus increasing the friction loss and energy consumption.

When the synchronizer 6 is in an engaged state, the synthesized (coupled) driving force of the engine unit 1 and the first motor generator 41 can be transferred to the wheels 200 after the torque multiplication of the transmission unit 2a, or the driving force of the wheels 200 can be transferred to the first motor generator 41 to generate electricity, both of which require that the power coupling device transmit a large torque and have high stability. The synchronizer 6 may meet this requirement well. However, if a clutch is used, an oversize clutch which does not match with the entire system (including an engine, a transmission, a motor, etc.) needs to be designed, thus increasing the arrangement difficulty, the weight and the cost, and having the risk of slipping under the action of an impact torque.

Moreover, the first motor generator 41 may adjust the speed of the transmission unit 2a, for example, the first motor generator 41 may adjust the speed of the transmission unit 2a with the rotating speed of the output unit 5 as a target speed, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present disclosure is compact in structure and easy to control.

In some embodiments, as shown in FIGS. 2, 6, 7, 14, 15, 17, and 18, the transmission unit 2a includes a transmission power input part 21a and a transmission power output part 22a. The transmission power input part 21a is selectively engaged with the engine unit 1 to transmit the power generated by the engine unit 1. The transmission power output part 22a is configured to output the power from the transmission power input part 21a to the output unit 5 via the synchronizer 6.

As shown in FIGS. 2, 6, 7, 14, 15, 17, and 18, the transmission power input part 21a includes an input shaft (e.g., a first input shaft 21, a second input shaft 22) and a driving gear 25 mounted on the input shaft. The input shaft is selectively engaged with the engine unit 1 to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below.

As shown in FIGS. 2, 6, 7, 14, 15, 17, and 18, the transmission power output part 22a includes an output shaft 24, and a driven gear 26 mounted on the output shaft 24 and configured to mesh with the driving gear 25 on the input shaft.

As shown in FIGS. 2-5, the output shaft 24 is configured to output at least a part of the power transmitted by the input shaft. Specifically, the output shaft 24 and the input shaft cooperate with each other to transmit the power. For example, the power transmission between the output shaft 24 and the input shaft may be realized by means of the driving gear 25 and the driven gear 26.

It would be appreciated that the power transmission between the output shaft 24 and the input shaft is not limited to this. In some embodiments, the manner of power transmission between the output shaft 24 and the input shaft may be selected according to practical applications. For example, the power transmission between the output shaft 24 and the input shaft may also be realized by means of a belt transmission mechanism, or a rack and pinion transmission mechanism.

In some embodiments, the output shaft 24 is configured to transmit at least a part of the power on the input shaft. For example, when the power transmission system 100 is in a certain transmission mode where, for example, the first motor generator 41 generates electricity, a part of the power on the input shaft may be used for the electricity generating of the first motor generator 41, and the other part of the power on the input shaft may be used to drive the vehicle to run. Certainly, all power on the input shaft may be used for the electricity generation of the first motor generator 41.

In some embodiments, the power transmission between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 can be directly connected rigidly with one of the input shaft and the output shaft 24. The direct power transmission has the advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has the advantages of enabling convenient arrangement and achieving the desired transmission ratio by providing a speed changing device and the like.

The output unit 5 may be used as a power output terminal of the output shaft 24 for outputting the power on the output shaft 24. The output unit 5 and the output shaft 24 may rotate differentially (i.e., at different speed) and not synchronously. In other words, there can be a rotating speed difference between the output unit 5 and the output shaft 24, and the output unit 5 and the output shaft 24 are not fixed with each other.

The synchronizer 6 is disposed on the output shaft 24. Specifically, as shown in FIGS. 1-6, the synchronizer 6 may include a splined hub 61 and a synchronizing sleeve 62. The splined hub 61 may be fixed on the output shaft 24, such that the splined hub 61 can rotate synchronously with the output shaft 24, while the synchronizing sleeve 62 may move in an axial direction of the output shaft 24 relative to the splined hub 61 so as to selectively engage with the output unit 5, such that the output unit 5 can rotate synchronously with the output shaft 24. In this way, the power may be transferred from the output unit 5 to the front and/or rear wheels 210, 220, thus driving the wheels 200. However, it would be appreciated that the structure of the synchronizer 6 is not limited to this embodiment.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating conditions of the vehicle, it is possible for the synchronizer 6 to switch from a disengaged state to an engaged state, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, greatly improving the transmission efficiency and reducing the energy loss. Furthermore, no torque engagement of the synchronizer 6 may be achieved, i.e. the radial friction force is much smaller than the average value in the related art or even there is no radial friction force during the engagement of the synchronizer 6.

In some embodiments, the output unit 5 is configured to drive a first pair of wheels, there is a pair of second motor generators 42 configured to drive the first pair of wheels. Further, there may be a plurality of second motor generators, for example, there may be another second motor generator 43 configured to drive a second pair of wheels. The first pair of wheels is one pair of a pair of front wheels 210 and a pair of rear wheels 220, and the second pair of wheels is the other pair of the pair of front wheels 210 and the pair of rear wheels 220. For example, as shown in FIGS. 2-8, the first pair of wheels refers to the front wheels 210 of the vehicle, and the second pair of wheels refers to the rear wheels 220 of the vehicle. It is understood that in other embodiments, the first pair of wheels can refer to the rear wheels 220 and the second pair of wheels can refer to the front wheels 210.

Therefore, the power transmission system 100 according to embodiments of the present disclosure has four types of power output sources, i.e. the engine unit 1, the first motor generator 41, the second motor generators 42 and 43, in which the engine unit 1, the first motor generator 41 and the second motor generator 42 may be configured to drive one pair of wheels of the vehicle, and the second motor generator 43 may be configured to drive the other pair of wheels of the vehicle. Therefore, the vehicle having the power transmission system 100 is operable as a four-wheel drive vehicle.

Moreover, during the switching of operating conditions of the vehicle, it is possible for the synchronizer 6 to switch from the disengaged state to the engaged state, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by provision of the second motor generators 42 and 43, the second motor generators 42 and 43 may compensate for the torque of the wheels 200, which is indirectly reflected in the output of the output unit 5. That is, the second motor generators 42 and 43 may indirectly adjust the rotating speed of the output unit 5. For example, when the synchronizer 6 switches from the disengaged state to the engaged state, the second motor generators 42 and 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generators 42 and 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

In short, the first motor generator 41 may adjust the rotating speed of the output unit 5 separately. In some embodiments, at least one of the second motor generators 42 and 43 may adjust the rotating speed of the output unit 5 separately. In some embodiments, the first motor generator 41, and the second motor generators 42 and 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generators 42 and 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments, as shown in FIGS. 2-9, there are a plurality of the input shafts, i.e. two or more input shafts. The input shafts are coaxial and fitted over one another sequentially. For example, if there are N input shafts, the $K^{th}$ input shaft is fitted over the $(K-1)^{th}$ input shaft, where N≥K≥2, and central axes of the N input shafts coincide with each other.

In some embodiments, as shown in FIGS. 2-7 and 9-19, when there are two input shafts, e.g. the first input shaft 21 and the second input shaft 22, the second input shaft 22 is fitted over the first input shaft 21 and central axes of the two input shafts coincide with each other. In some embodiments, as shown in FIG. 8, when there are three input shafts, e.g. the first input shaft 21, the second input shaft 22 and a third the input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmission, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIGS. 2-6 and 9, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

In some embodiments, a plurality of driven gears 26 are fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present disclosure is not limited to this. For example, the number of the driving gears 25 on each input shaft is not limited to one, and accordingly a plurality of driven gears 26 are fixed on the output shaft 24 to form a plurality of gears.

As shown in FIGS. 2-6 and 9, the driven gears 26 are configured to mesh with the driving gears 25 on the input shafts respectively. In one embodiment, the number of the driven gears 26 may be the same as that of the input shafts. For example, when there are two driven gears 26, there are two input shafts, such that the two driven gears 26 may be configured to mesh with the driving gears 25 on the two input shafts to transmit the power, to make the two pairs of gears form two gears for power transmission.

In some embodiments, three or more input shafts may be provided according to the power transmission requirements, and each input shaft may be provided with one driving gear 25. Therefore, the larger the number of the input shafts, the larger the number of the gears is, and the wider range of the transmission ratio of the power transmission system 100 is, so as to adapt to the power transmission requirements of various vehicles.

In some embodiments, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

In some embodiments, the first input shaft 21 may be supported by bearings. For example, a plurality of bearings can be disposed in an axial direction of the first input shaft 21 at a position not influencing the assembly of other components. Similarly, the second input shaft 22 may also be supported by bearings.

Further, in some embodiments, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is coupled with the input terminal 313 of the dual clutch 31. Specifically, the engine unit 1 may be coupled with the input terminal 313 of the dual clutch 31 via for example, a flywheel, a damper, or a torsion plate.

The first output terminal 311 of the dual clutch 31 is coupled with the first input shaft 21, such that the first output terminal 311 rotates synchronously with the first input shaft 21. The second output terminal 312 of the dual clutch 31 is coupled with the second input shaft 22, such that the second output terminal 312 rotates synchronously with the second input shaft 22.

The input terminal 313 of the dual clutch 31 may be a shell of the dual clutch 31, and the first output terminal 311 and the second output terminal 312 of the dual clutch 31 may be two driven discs. The shell may be disconnected from the two driven discs, such that the input terminal 313 is disconnected from the first output terminal 311 and the second output terminal 312. When one driven disc needs to be engaged, the shell can be controlled to engage with the corresponding driven disc to rotate synchronously with the driven disc, e.g. the input terminal 313 is engaged with one of the first output terminal 311 and the second output terminal 312, such that the power transmitted from the input terminal 313 may be output via one of the first output terminal 311 and the second output terminal 312. Typically, the shell is engaged with one driven disc at a time.

It would be appreciated that the engagement of the dual clutch 31 is influenced by a control strategy. The control strategy may be set according to the desired power transmission mode, e.g. switching between a mode in which the input terminal 313 is disconnected from the first output terminal 311 and the second output terminal 312 and a mode in which the input terminal 313 is engaged with one of the first output terminal 311 and the second output terminal 312.

In some embodiments, as shown in FIGS. 2-7, since the input shaft has a concentric biaxial structure and each input shaft is provided with a driving gear 25, the transmission unit 2a has two different gears, and the engine unit 1 may output the power to the output unit 5 via the two gears, while the synchronizer 6 can remain in an engaged state to engage the output shaft 24 with the output unit 5.

During the gear shift, the synchronizer 6 may not need to be first disengaged and then move axially to engage with other gears. According to embodiments of the present disclosure, only the engagement/disengagement of the dual clutch 31 needs to be controlled, while the synchronizer 6 can remain in the engaged state. In this way, when the engine unit 1 outputs the power to the output unit 5, only one gear shift actuating element, e.g. the dual clutch 31 needs to be controlled, thus simplifying the control strategy greatly, reducing the number of engagement/disengagement times of, for example, the synchronizer 6, and extending its life.

In some embodiments, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, in some embodiments, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
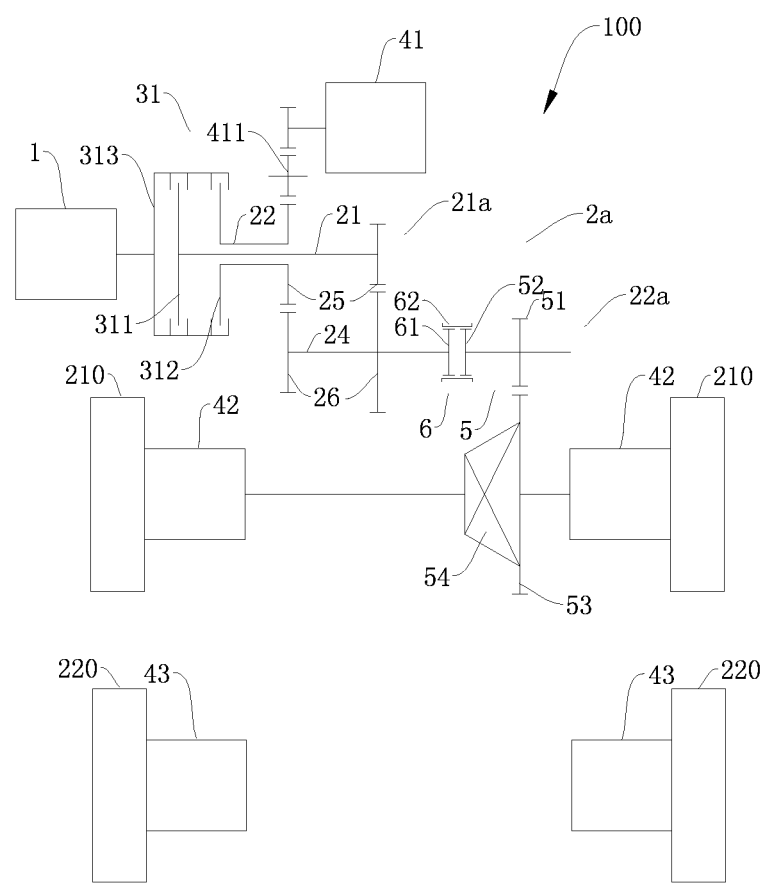
FIG. 2 is a schematic view of an exemplary power transmission system according to an embodiment of the present disclosure.

In order to facilitate the spatial arrangement, in some embodiments, the first motor generator 41 may transmit the power via an intermediate gear 411. In some embodiments, as shown in the example shown in FIGS. 2-3, indirect power transmission between the first motor generator 41 and the driving gear 25 on the first input shaft 21 via the intermediate gear 411 can be performed. In some embodiments, as shown in FIG. 2, indirect power transmission between the first motor generator 41 and the driving gear 25 on the second input shaft 22 via the intermediate gear 411 can be performed.

However, the present disclosure is not limited to this embodiment. In other embodiments, the first motor generator 41 is configured to connect with one of the first input shaft 21 and the output shaft 24. In some embodiments, the first motor generator 41 is configured to directly connect with the first input shaft 21. In some embodiments, the first motor generator 41 is configured to directly connect with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
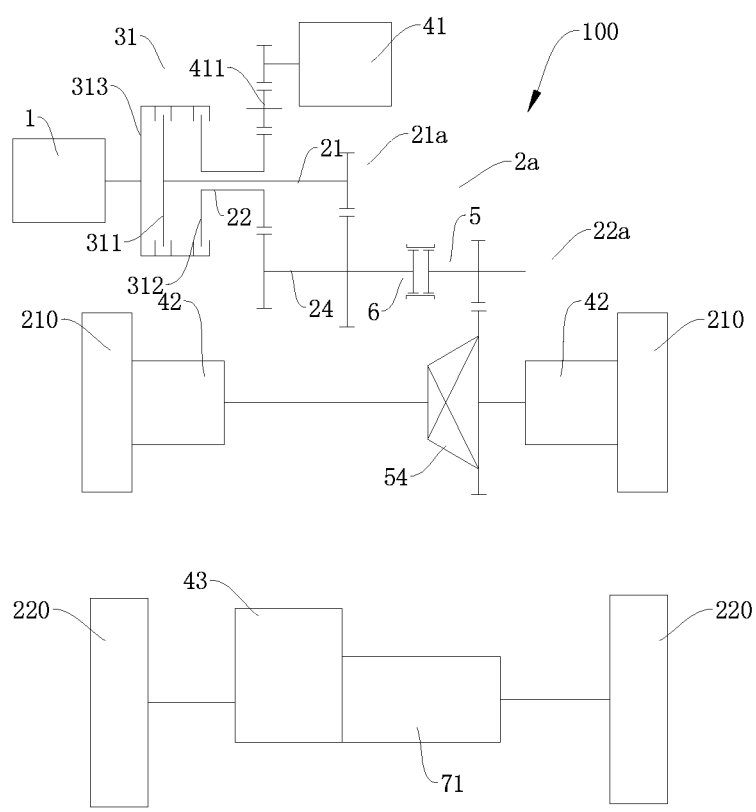
FIG. 4 is a schematic view of an exemplary power transmission system according to still another embodiment of the present disclosure.

In some embodiments, as shown in FIG. 4, the first motor generator 41 is arranged coaxially with the first input shaft 21, and the first motor generator 41 is arranged coaxially with the engine unit 1, which allows. a rotation axis of a rotor of the first motor generator 41 to substantially coincide with a rotation axis of a crankshaft of the engine unit 1. Therefore, the power transmission system 100 becomes more compact in structure.

In some embodiments, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52 to form a rigid connection between the output shaft 24, the synchronizer 6 and the output unit 5, so as to rotate the output shaft 24, the synchronizer 6 and the output unit 5 synchronously.

In order to reduce the number of intermediate transmission components, to reduce the energy loss, and to enhance the transmission efficiency of the power transmission system 100, in some embodiments, as shown in FIGS. 2-6, the output gear 51 may be a driving gear of a main reducer and is configured to directly mesh with a driven gear 53 of the main reducer to output the power, so as to drive the wheels 200. However, the present disclosure is not limited to this, and other intermediate transmission components may also be disposed between the output gear 51 and the main reducer.

In some embodiments, as shown in FIGS. 2-10, a differential 54 is disposed between the first pair of wheels such as the front wheels 210. The differential 54 cooperates with the output unit 5 for power transmission. In some embodiments, the differential 54 is provided with the driven gear 53 thereon, and the output gear 51 becomes the driving gear of the main reducer configured to mesh with the driven gear 53, such that the power may be transferred to the two front wheels 210 via the driving gear of the main reducer, the driven gear 53 of the main reducer and the differential 54 sequentially.

The function of the differential 54 is to distribute the power to the two front wheels 210 reasonably. The differential 54 may be a gear differential, a mandatory locking differential, or the Torsen differential, which may be selected according to different vehicles.

Figure 5:
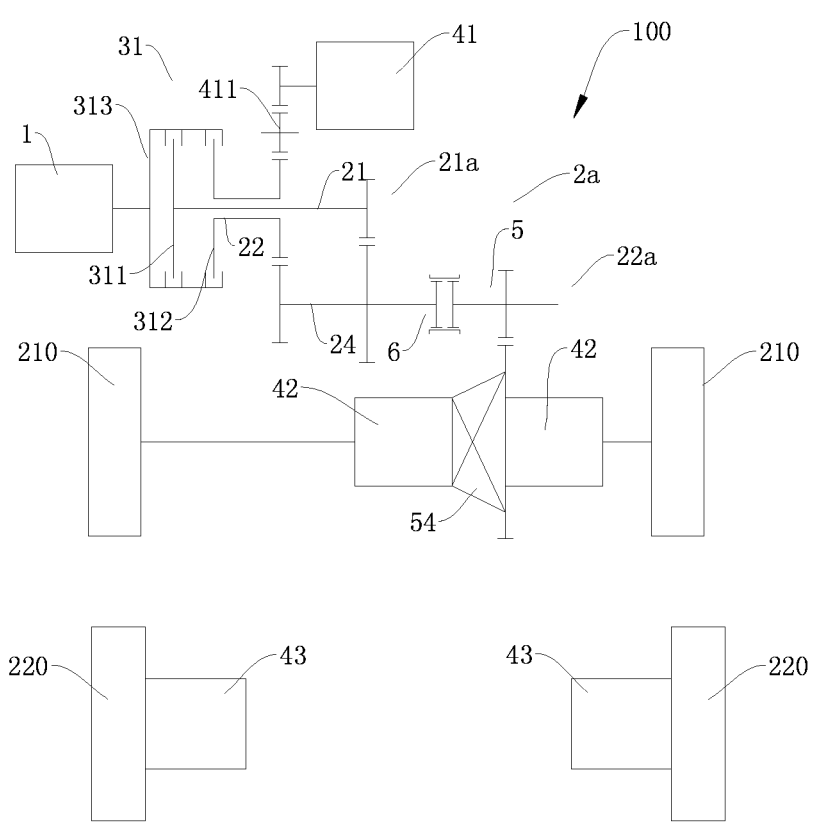
FIG. 5 is a schematic view of an exemplary power transmission system according to yet another embodiment of the present disclosure.
Figure 6:
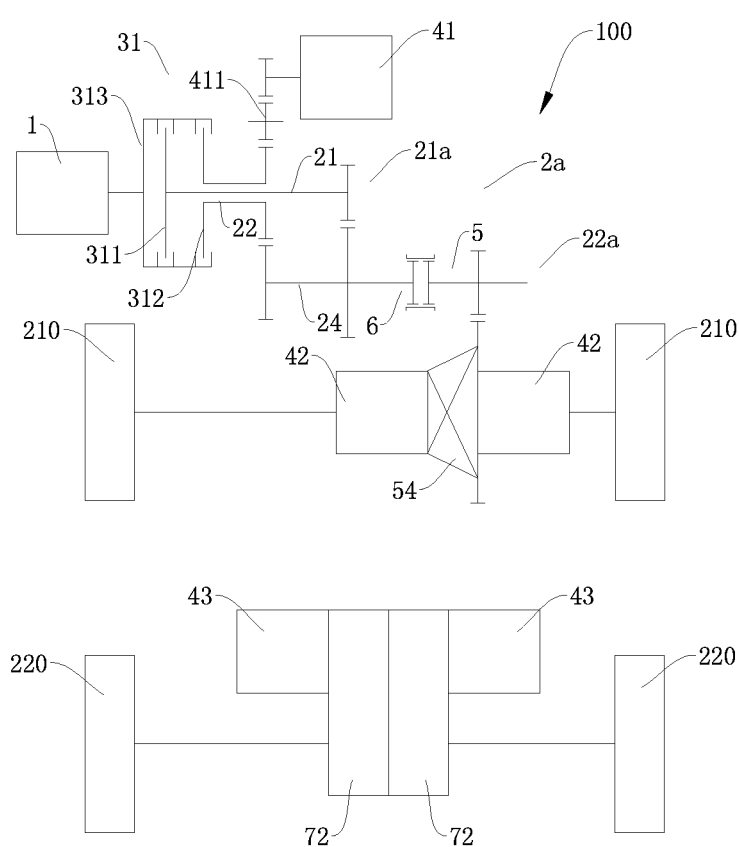
FIG. 6 is a schematic view of an exemplary power transmission system according to yet another embodiment of the present disclosure.
Figure 7:
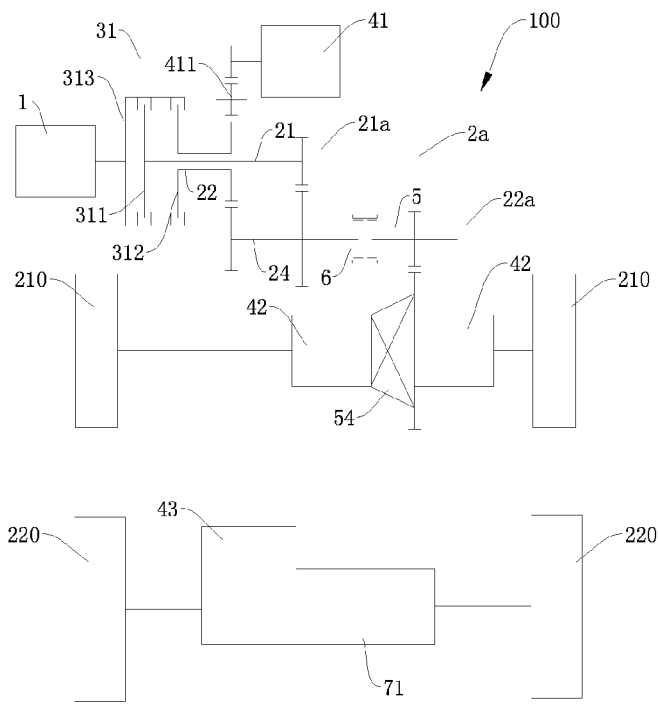
FIG. 7 is a schematic view of an exemplary power transmission system according to yet another embodiment of the present disclosure.
Figure 8:
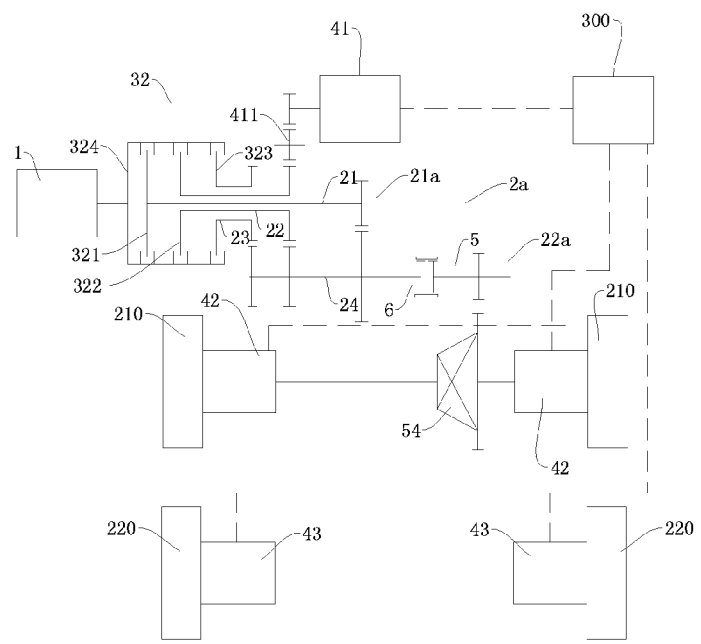
FIG. 8 is a schematic view of an exemplary power transmission system according to yet another embodiment of the present disclosure.
Figure 10:
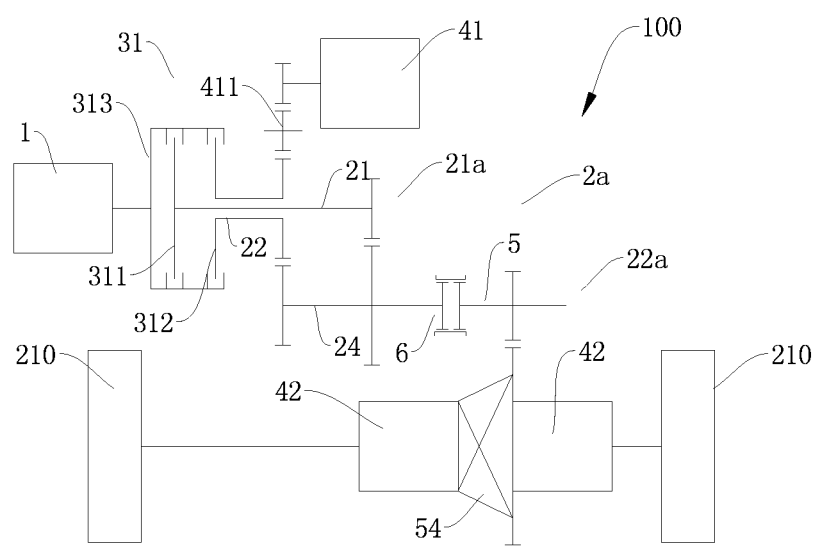
FIG. 10 is a schematic view of an exemplary power transmission system according to yet another embodiment of the present disclosure.

In some embodiments, as shown in FIGS. 5-7 and 10, a pair of second motor generators 42 is disposed on two sides of the differential 54 back to back. For example, a pair of second motor generators 42 is disposed on two sides of the differential 54 and integrally formed with the differential 54. For example, the left second motor generator 42 can be disposed between a left half shaft and the differential 54, and the right second motor generator 42 can be disposed between a right half shaft and the differential 54. The power transmission system 100 in FIGS. 5-7 is operable in a four-wheel drive mode, and the power transmission system 100 in FIG. 10 is operable in a two-wheel drive mode. It should be noted that in the following, when referring to "motor generators are disposed on two sides of the differential 54 back to back," it means that the motor generators are disposed on two sides of the differential 54 respectively and integrally formed with the differential 54.

Figure 3:
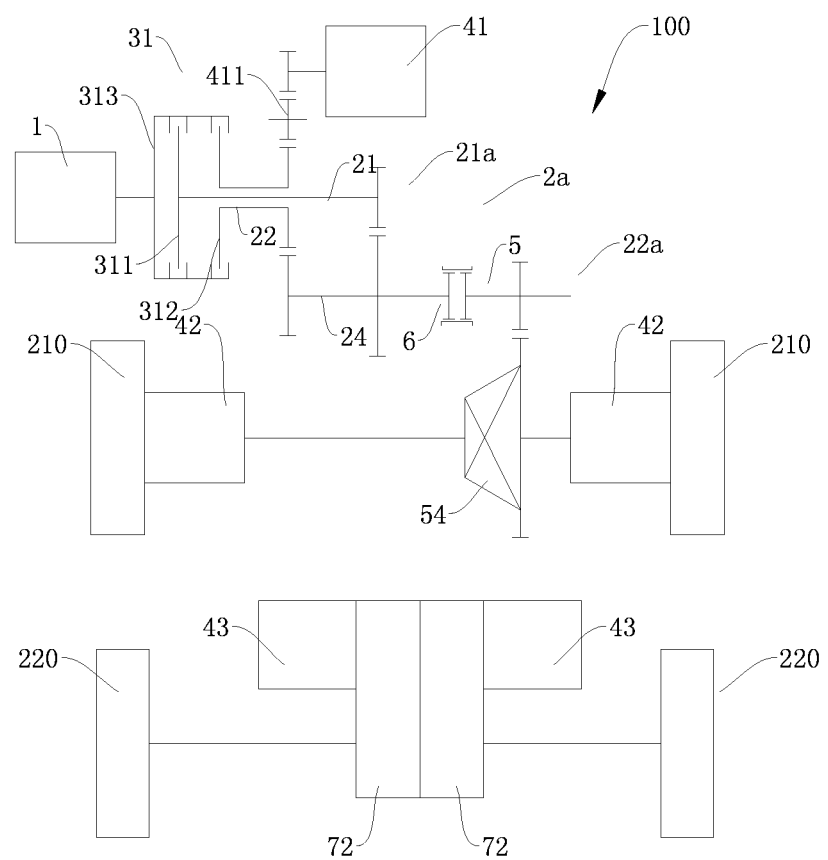
FIG. 3 is a schematic view of an exemplary power transmission system according to another embodiment of the present disclosure.
Figure 9:
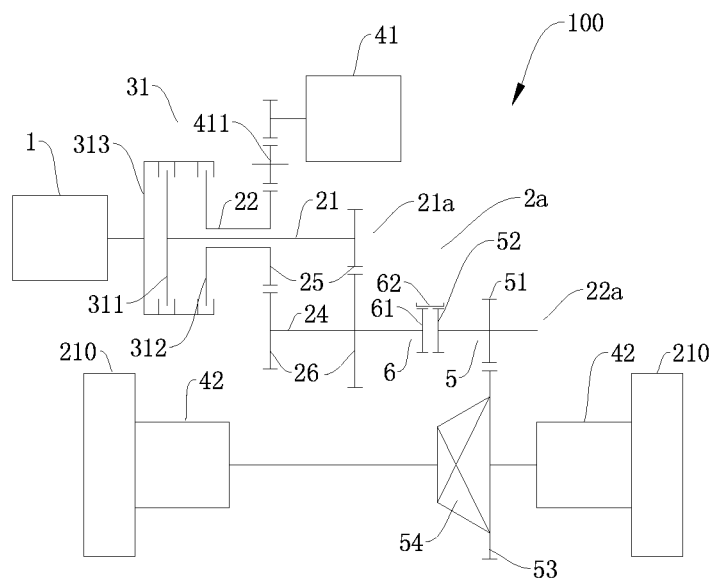
FIG. 9 is a schematic view of an exemplary power transmission system according to yet another embodiment of the present disclosure.

In some embodiments, as shown in FIGS. 2-4 and 9, the second motor generator 42 is a wheel-side motor. One of the second motor generators 42 is disposed at an inner side of the left front wheel and the other of the second motor generators 42 is disposed at an inner side of the right front wheel, and the second motor generator 42 may transfer the power to a hub of a corresponding wheel via a gear mechanism. The power transmission system 100 in FIGS. 2-4 is operable in a four-wheel drive mode, and the power transmission system 100 in FIG. 9 is operable in a two-wheel drive mode.

In some embodiments, two second motor generators 43 are provided, and the second motor generators 43 are a wheel-side motor, as shown in FIGS. 2 and 5. In other words, in the examples shown in FIGS. 2 and 5, one of the second motor generators 43 is disposed on an inner side of the left rear wheel, and the other of the second motor generators 43 is disposed on an inner side of the right rear wheel, and the second motor generator 43 may transfer the power to a corresponding rear wheel via a gear mechanism.

In some embodiments, one second motor generator 43 is provided, and the second motor generator 43 drives the second pair of wheels via a first speed changing mechanism 71, as shown in FIG. 7. The first speed changing mechanism 71 can be a reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the second pair of wheels may be connected with each other via an axle which may have an integral structure. The second motor generator 43 may directly drive the integral axle via the first speed changing mechanism 71, to drive the two wheels to rotate synchronously.

In some embodiments, two second motor generators 43 are provided, and each second motor generator 43 drives one of the second pair of wheels via a second speed changing mechanism 72, as shown in FIGS. 3 and 6. The second speed changing mechanism 72 is a speed reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the two wheels in the second pair may be connected with the corresponding second motor generators 43 and the corresponding second speed changing mechanisms 72 via two half axles respectively. In other words, one of the second motor generators 43 may drive a corresponding half axle via one of the second speed changing mechanisms 72, so as to drive the wheel at an outer side of the half axle to rotate.

Figure 11:
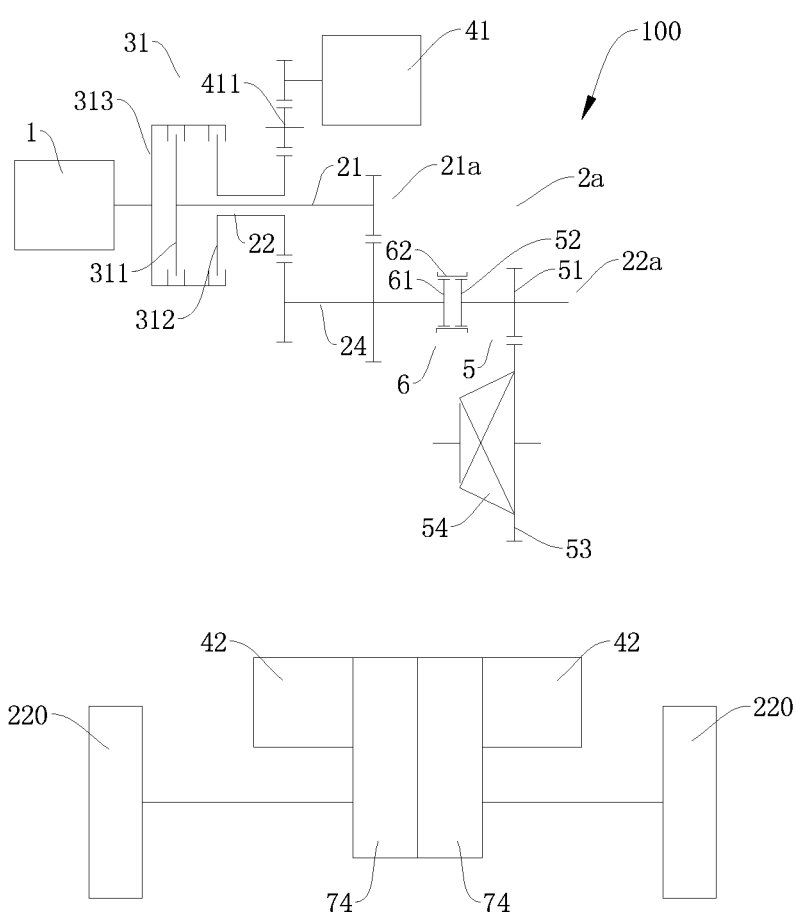
FIG. 11 is a schematic view of an exemplary power transmission system according to yet another embodiment of the present disclosure.
Figure 12:
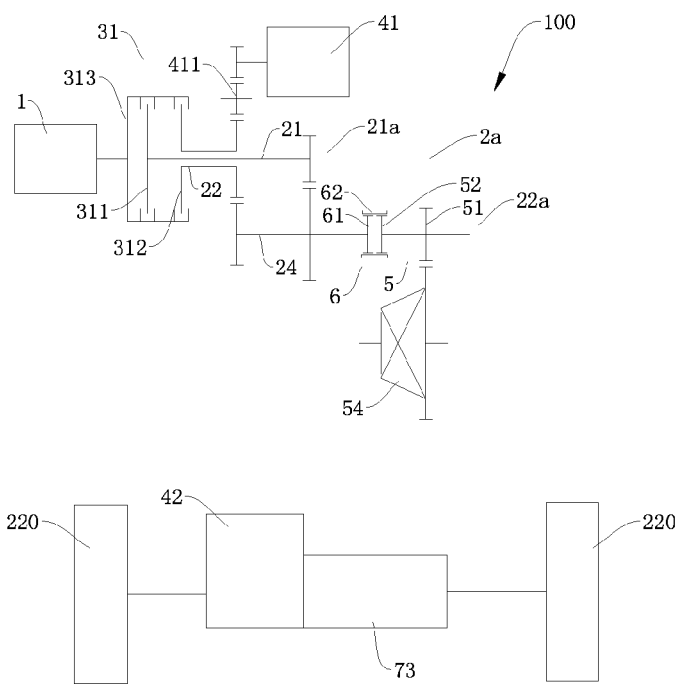
FIG. 12 is a schematic view of an exemplary power transmission system according to yet another embodiment of the present disclosure.
Figure 13:
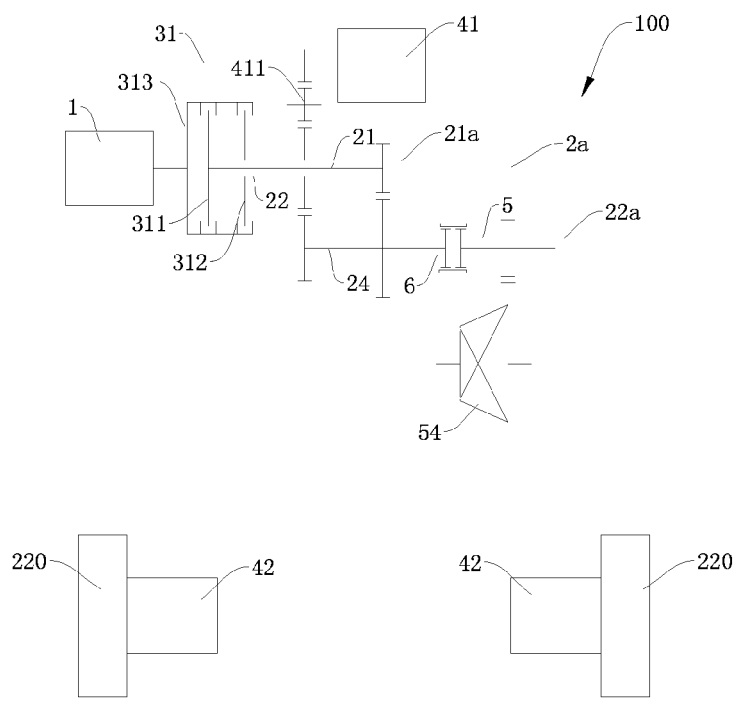
FIG. 13 is a schematic view of an exemplary power transmission system according to yet another embodiment of the present disclosure.

In some embodiments, as shown in FIGS. 9-10, the power transmission system 100 is operable in a two-wheel drive mode. In an example shown in FIG. 9, the output unit 5 drives the front wheels 210, and the second motor generator 42 is a wheel-side motor and is configured to drive the front wheels 210. In the example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. In some embodiments, as shown in FIGS. 11-13, the power transmission system 100 is operable in a four-wheel drive mode. In an example shown in FIG. 11, the output unit 5 drives the front wheels 210, two second motor generators 42 are provided, and each second motor generator 42 drives one rear wheel 220 via one fourth speed changing mechanism 74. In an example shown in FIG. 12, the output unit 5 drives the front wheels 210, one second motor generator 42 is provided, and the second motor generator 42 drives the rear wheels 220 via one third speed changing mechanism 73. In an example shown in FIG. 13, the output unit 5 drives the front wheels 210, and two second motor generators 42 are provided, which wheel-side motors, and are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments, the power transmission system 100 may also include a battery pack 300. The battery pack 300 is connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery pack 300, and electric energy recovered by the second motor generator 42 and the third motor generator 43 during the braking may also be supplied to and stored in the battery pack 300. When the vehicle is operated in an EV mode, the battery pack 300 may supply electric energy to at least one of the first motor generator 41, the second motor generator 42 and the third motor generator 43. It would be appreciated that the dotted lines shown in FIG. 8 indicates that the battery pack 300 is electrically connected with the first motor generator 41, the second motor generator 42 and the third motor generator 43 respectively.

In some embodiments, as shown in FIG. 8, the power transmission system 100 comprises input shafts which include three shafts, e.g. the first input shaft 21, the second input shaft 22 and the third input shaft 23, with the second input shaft 22 fitted over the first input shaft 21, and the third input shaft 23 fitted over the second input shaft 22.

In these embodiments, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

In some embodiments, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, and 323, or may be disconnected with the first, second and third output terminals 321, 322, and 323. It would be appreciated that the operation principle of the triple clutch 32 is similar to that of the dual clutch 31, so the detailed description thereof will be omitted here.

Other parts such as the power transmission manner between the first motor generator 41 and the first input shaft 21 or the output shaft 24 as well as the position and drive mode of the second motor generators 42 and 43, are also similar to those described with respect to the dual clutch 31, so the detailed description thereof will be omitted here.

In some embodiments, in this power transmission system 100 includes a driven gear 26 which is configured as a linked gear, and the linked gear 26 is capable of rotating differentially relative to the output shaft. For example, the linked gear 26 is freely fitted over the output shaft 24. The synchronizer 6 is fixed on the output shaft 24 and may be selectively engaged with the linked gear 26.

In these embodiments, two input shafts are provided, e.g. the first input shaft 21 and the second input shaft 22, and each input shaft is provided with one driving gear 25. The linked gear 26 can be a double-linked gear. The double-linked gear 26 has a first gear part 261 and a second gear part 262, and the first gear part 261 and the second gear part 262 are configured to mesh with two driving gears 25 respectively.

When the power transmission system 100 in this embodiment transmits the power, the synchronizer 6 may be engaged with the double-linked gear 26, such that the power output by at least one of the engine unit 1 and the first motor generator 41 may be output via the output unit 5 (e.g., the driving gear 51 of the main reducer).

In these embodiments, the power transmission between the first motor generator 41 and the output shaft 24 may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will also be omitted here.

Figure 14:
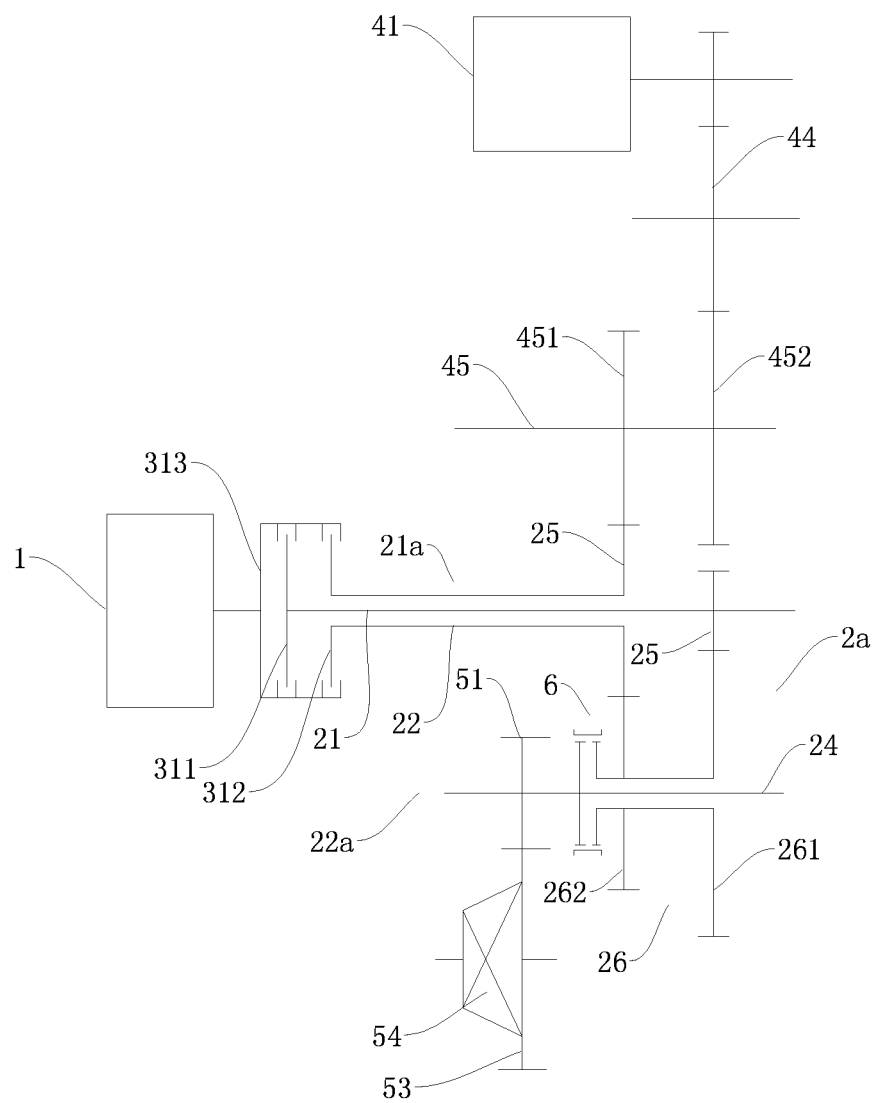
FIG. 14 is a schematic view of an exemplary power transmission system according to yet another embodiment of the present disclosure.
Figure 15:
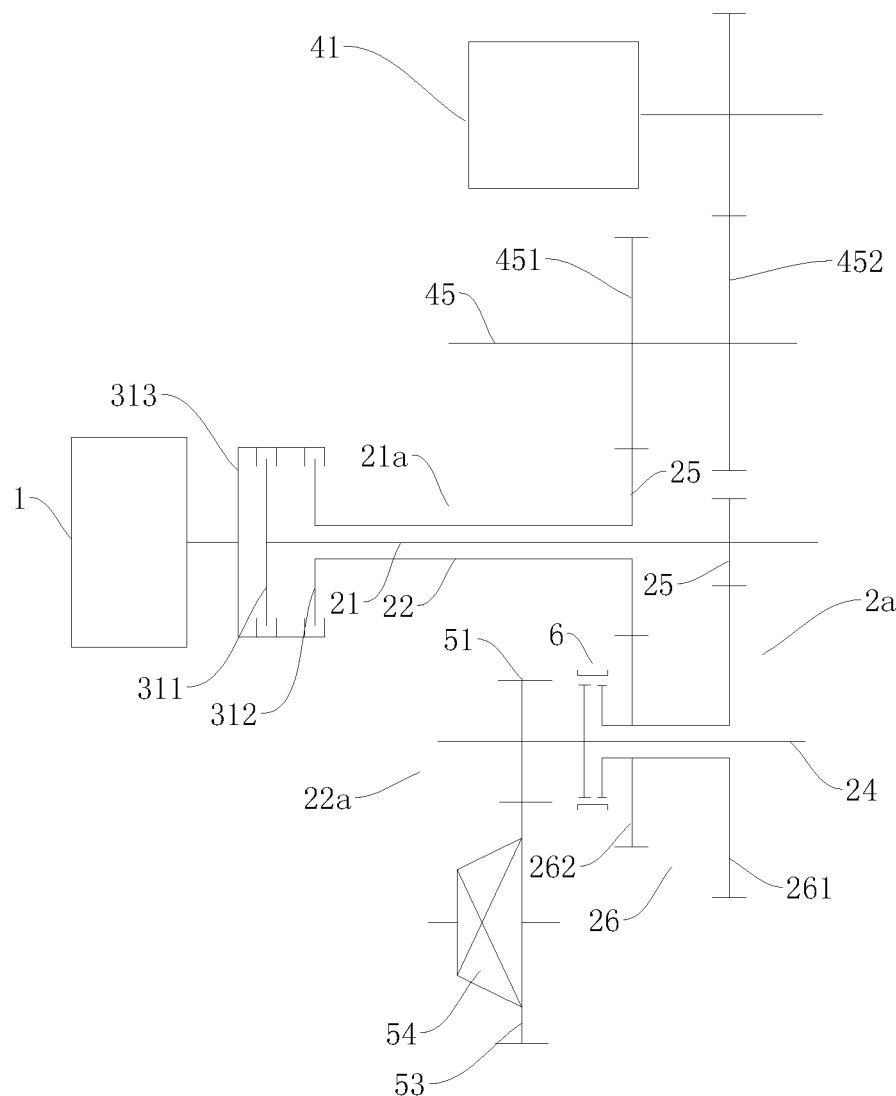
FIG. 15 is a schematic view of an exemplary power transmission system according to yet another embodiment of the present disclosure.
Figure 16:
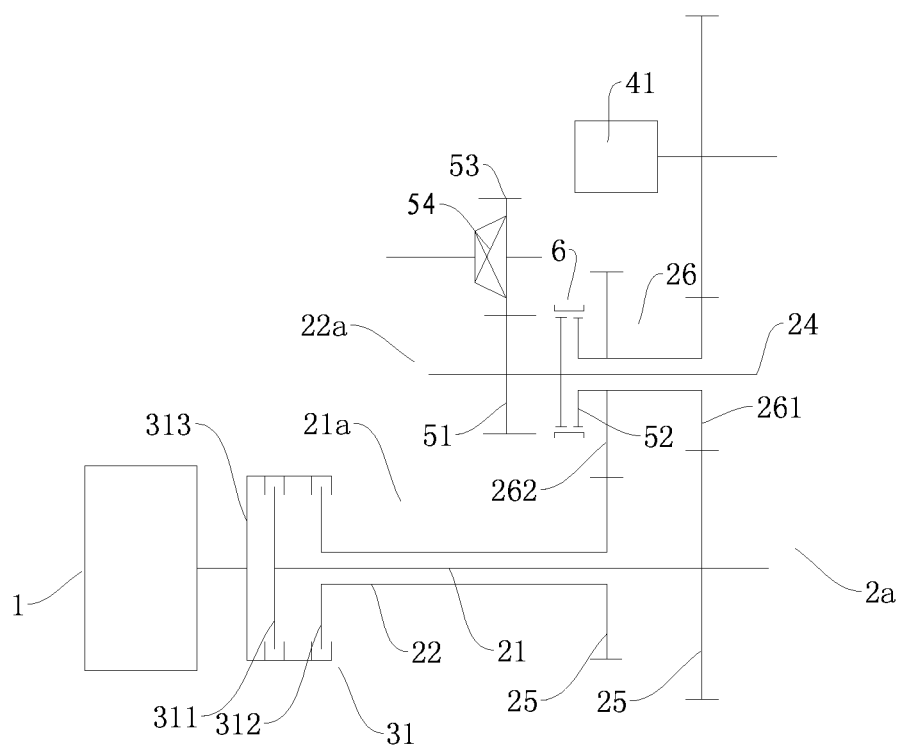
FIG. 16 is a schematic view of an exemplary power transmission system according to yet another embodiment of the present disclosure.

In these embodiments, as shown in FIGS. 14-16, the power transmission system 100 may include an engine unit 1, a plurality of input shafts, an output shaft 24, an output unit 5 (e.g., the driving gear 51 of the main reducer), a synchronizer 6 and a first motor generator 41.

The power transmission system 100 in these embodiments may include a driven gear 26 which is configured as a linked gear and can be freely fitted over the output shaft 24. With the output unit 5 fixed on the output shaft 24, the synchronizer 6 can be configured to engage with the linked gear. In these embodiments, the arrangement of the first motor generator 41 may slightly differ from that of the first motor generator 41 in the power transmission system 100 shown in FIGS. 2-13.

In some embodiments, as shown in FIGS. 14-16, a plurality of input shafts are provided, the input shafts are provided with the driving gears 25 thereon. The linked gear 26 is freely fitted over the output shaft 24. The linked gear 26 has a plurality of gear parts (for example, the first gear part 261, and the second gear part 262), and the gear parts are configured to mesh with the driving gears 25 on the input shafts respectively.

As shown in FIGS. 14-16, the output unit 5 is configured to output the power from the output shaft 24. For example, the output unit 5 is fixed on the output shaft 24. In some embodiments, by way of example and without limitation, the output unit 5 may include the driving gear 51 of the main reducer.

The synchronizer 6 is disposed on the output shaft 24. The synchronizer 6 is configured to selectively engage with the linked gear 26, so as to output the power via the output unit 5 to drive the wheels of the vehicle. The power transmission between the first motor generator 41 and one of the input shaft and the output shaft 24 may be direct or indirect.

In these embodiments, the function of the synchronizer 6 is substantially the same as that of the synchronizer 6 shown in FIGS. 2-13. The synchronizer 6 in these embodiments is configured to engage the linked gear 26 with the output shaft 24, while the synchronizer 6 shown in FIGS. 2-13 is configured to engage the output unit 5 with the output shaft 24.

Specifically, in these embodiments, the function of the synchronizer 6 is to synchronize the linked gear 26 with the output shaft 24, i.e. after the synchronization of the synchronizer 6, the linked gear 26 and the output shaft 24 can operate synchronously, so as to output the power from at least one of the engine unit 1 and the first motor generator 41 with the output unit 5 as a power output terminal. When the linked gear 26 and the output shaft 24 are not synchronized by the synchronizer 6, the power from at least one of the engine unit 1 and the first motor generator 41 may not be directly output to the wheels 200 via the output unit 5.

In these embodiments, the synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear 26 with the rotating speed of the output shaft 24 as a target speed, so as to match the speed of the linked gear 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments, the input shafts are coaxial and fitted over one another, and each input shaft is provided with one driving gear 25. In some embodiments, the input shafts include a first input shaft 21 and a second input shaft 22, and each input shaft is provided with one driving gear 25. The linked gear 26 is a double-linked gear, the double-linked gear 26 has a first gear part 261 and a second gear part 262, and the first gear part 261 and the second gear part 262 are configured to mesh with two driving gears 25 respectively.

In these embodiments, a dual clutch 31 may be disposed between the engine unit 1 and the first and second input shafts 21 and 22, which is similar to the dual clutch 31 in the power transmission system 100 shown in FIGS. 2-13. Alternatively, the dual clutch 31 may be provided with a damping structure thereon, for example, the damping structure may be arranged between a first output terminal and an input terminal of the dual clutch 31, to adapt to start the vehicle at a low gear.

As shown in FIGS. 14-16, direct or indirect power transmission between an output terminal of the first motor generator 41 and one driving gear can be performed.

For example, the power transmission system 100 in these embodiments further includes an intermediate shaft 45. A first intermediate shaft gear 451 and a second intermediate shaft gear 452 are fixed on the intermediate shaft 45. One of the first and second intermediate shaft gears 431 and 452 is configured to mesh with one driving gear 25. For example, as shown in FIGS. 14-15, the first intermediate shaft gear 451 is configured to mesh with the driving gear 25 on the second input shaft 22. Of course, the present disclosure is not limited to these examples.

In some embodiments, direct power transmission between the output terminal of the first motor generator 41 and one of the first and second intermediate shaft gears 431 and 452, or indirect power transmission between the output terminal of the first motor generator 41 and one of the first and second intermediate shaft gears 431 and 452 via an intermediate idler 44 can be performed. For example, as shown in FIG. 14, indirect power transmission between the output terminal of the first motor generator 41 and the second intermediate shaft gear 452 via an intermediate idler 44 is performed. As another example, as shown in FIG. 15, the output terminal of the first motor generator 41 is configured to directly mesh with the second intermediate shaft gear 452 for power transmission.

As shown in FIG. 16, the output terminal of the first motor generator 41 is configured to directly mesh with one gear part of the linked gear 26. For example, the output terminal of the first motor generator 41 can be configured to directly mesh with the first gear part 261 for power transmission.

However, it would be appreciated that, the present disclosure is not limited to this. The position of the first motor generator 41 may be designed according to practical requirements. For example, the position of the first motor generator 41 may be the same as that described above, or may be as shown in FIGS. 2-13, which will not be described in detail here.

As shown in FIGS. 14-15, the first gear part 261 inputs a torque to the engine unit 1 separately from the second gear part 262, which may input a torque to at least one of the engine unit 1 and the first motor generator 41.

As shown in FIGS. 14-16, an engagement gear ring 52 is fixed on a side of the linked gear 26 facing the synchronizer 6, and the synchronizer 6 is configured to engage with the engagement gear ring 52, such that the linked gear 26 is fixed with the output shaft 24 to rotate synchronously with the output shaft 24.

Figure 17:
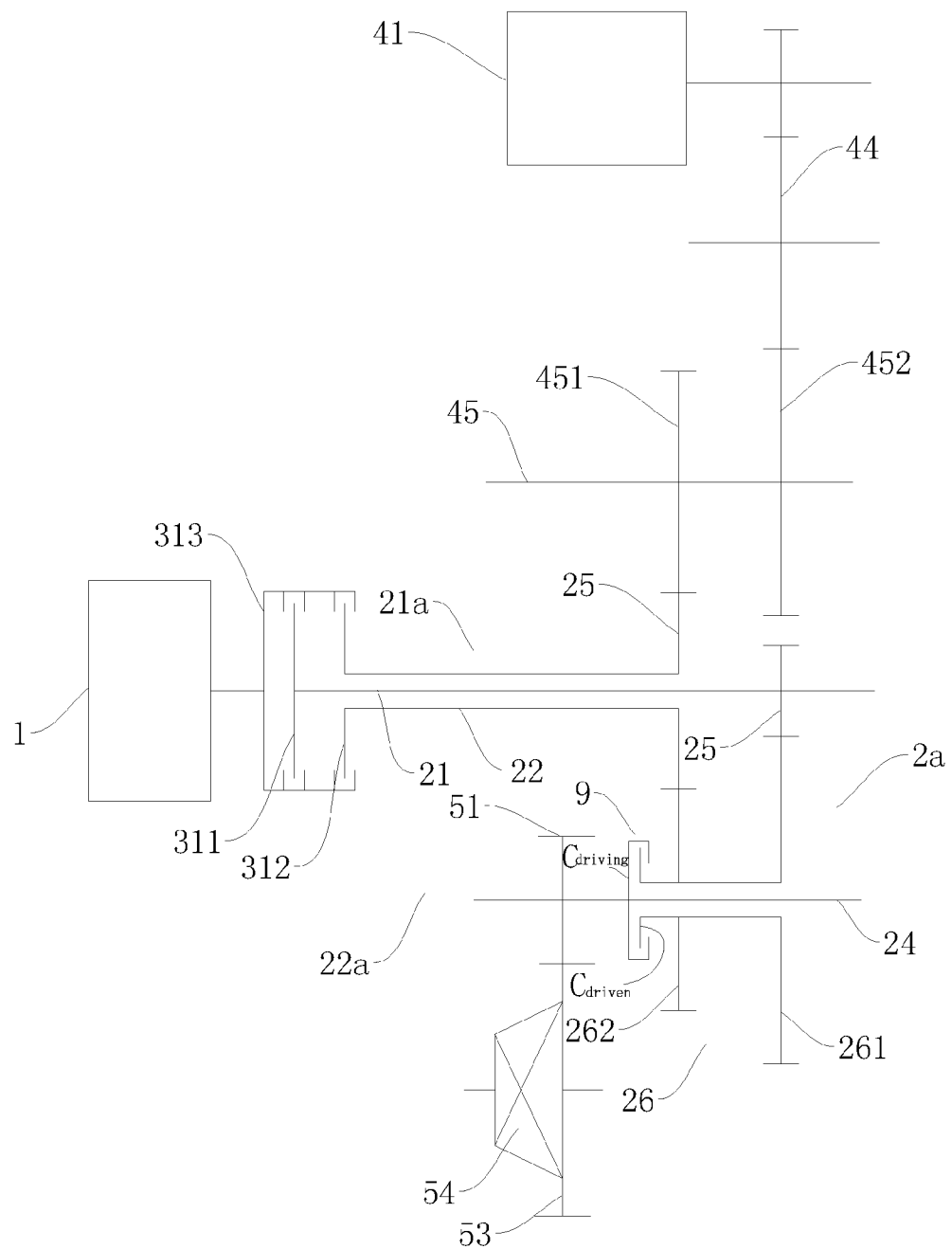
FIG. 17 is a schematic view of an exemplary power transmission system according to yet another embodiment of the present disclosure.
Figure 18:
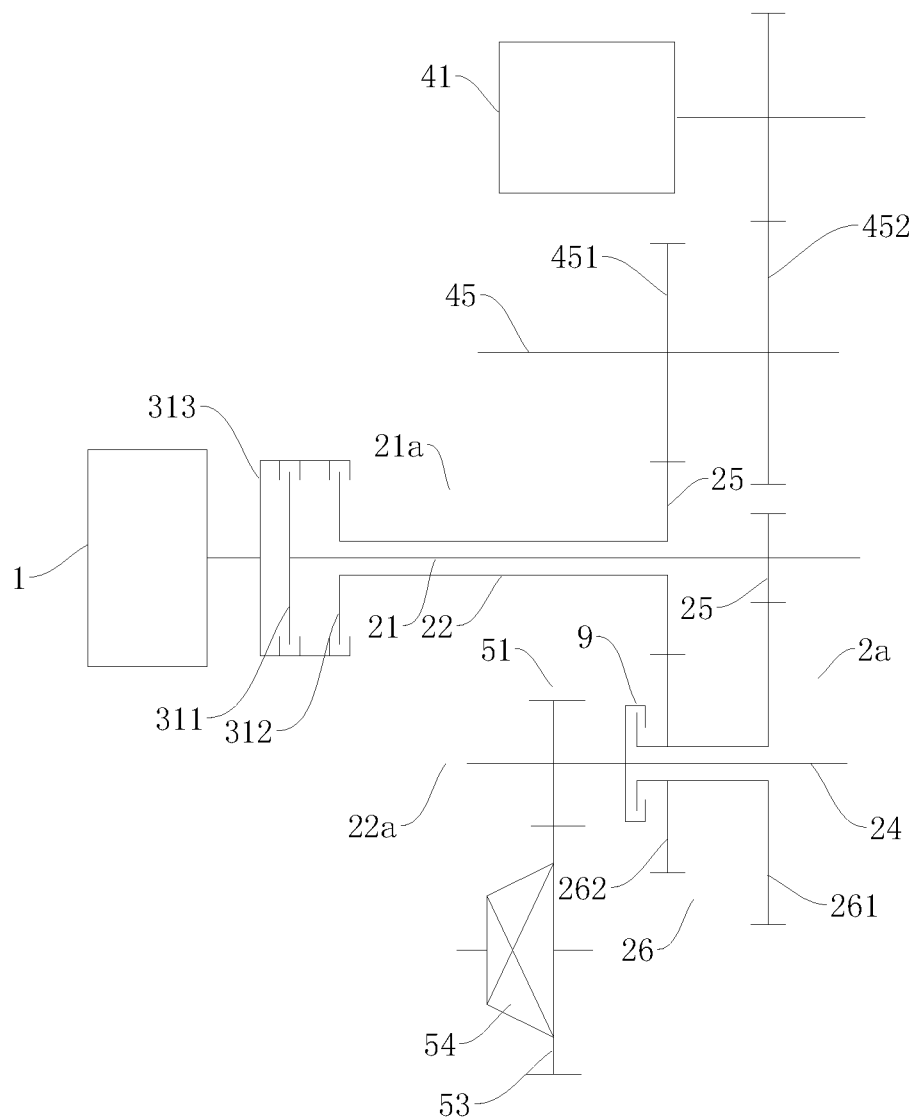
FIG. 18 is a schematic view of an exemplary power transmission system according to yet another embodiment of the present disclosure.
Figure 19:
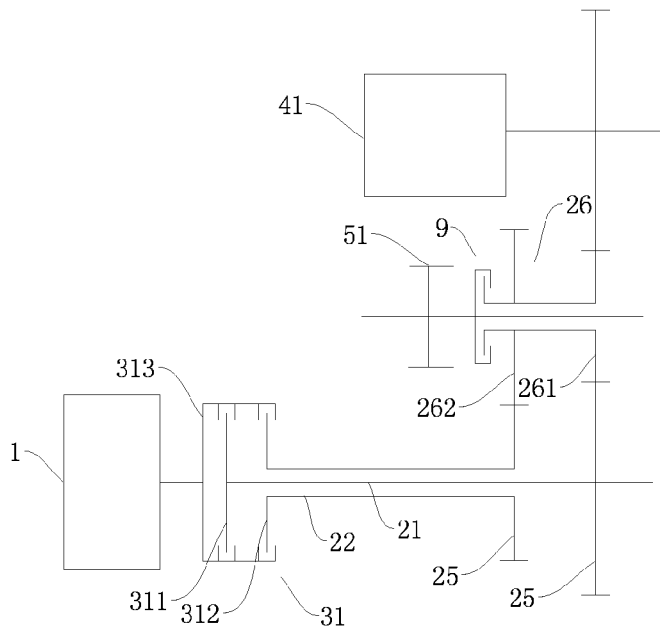
FIG. 19 is a schematic view of an exemplary power transmission system according to yet another embodiment of the present disclosure.

In some embodiments, as shown in FIGS. 17-19, the synchronizer 6 in the above embodiments can be replaced with a clutch 9.

Specifically, in these embodiments, as shown in FIGS. 17-19, the power switching device is a clutch 9. The clutch 9 is configured to enable or interrupt a power transmission between the transmission unit 2a and the output unit 5. For example, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In these embodiments, the double-linked gear 26 is freely fitted over the output shaft 24, and the output unit 5 is fixed on the output shaft 24. The clutch 9 has a driving part ($C_{driving}$ in FIG. 17) and a driven part ($C_{driven}$ in FIG. 17). One of the driving part and the driven part of the clutch 9 is disposed on a linked gear such as a double-linked gear 26, and the other of the driving part and the driven part of the clutch 9 is disposed on the output shaft 24. The driving part and the driven part of the clutch 9 may be disengaged from or engaged with each other. For example, as shown in FIG. 17, the driving part may be disposed on the output shaft 24, and the driven part may be disposed on the linked gear 26, but the present disclosure is not limited to this.

Therefore, after the driving part and the driven part of the clutch 9 are engaged with each other, the output shaft 24 is engaged with the double-linked gear 26 freely fitted over the output shaft 24, so as to output the power via the output unit 5. After the driving part and the driven part of the clutch 9 are disengaged from each other, the linked gear 26 is freely fitted over the output shaft 24, and the output unit 5 does not transfer the power from the transmission unit 2a.

With the power transmission system 100 according to embodiments of the present disclosure, since the synchronizer 6 is used for power switching and has advantages of small volume, simple structure, large torque transmission and high transmission efficiency, the power transmission system 100 according to embodiments of the present disclosure has a reduced volume, a more compact structure and high transmission efficiency, and may meet the large-torque transmission requirements.

Meanwhile, by the speed compensation of at least one of the first motor generator 41, the second motor generators 42 and 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments, as shown in FIGS. 2, 3, 5, 6 and 8, four motor generators are used, and each motor generator is configured to drive one wheel. In the related art, a mechanical four-wheel drive vehicle may only achieve the torque distribution of front and rear wheels, and a full-time four-wheel drive vehicle may only achieve small difference in instantaneous torque of left and right wheels. However, in these embodiments, since four motors are used for driving the vehicle, +100% to −100% torque difference adjustment of the left and right wheel motors may be realized, thus greatly enhancing the steering stability during the high-speed turning, and improving the understeer and oversteer performances. Furthermore, the turning radius of the vehicle may be greatly reduced by the rotation of the left and right wheels in opposite directions when the vehicle runs at a low speed, such that the vehicle is easy to operate.

The construction and operating conditions of the power transmission system 100 in various examples will be described below with reference to FIGS. 2-19.

Example 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, and indirect power transmission between the first motor generator 41 and the driving gear 25 on the second input shaft 22 is performed via one intermediate gear 411. The output shaft 24 is provided with two driven gears 26, and the two driven gears 26 are configured to mesh with the driving gears 25 on the first input shaft 21 and the second input shaft 22, to form two gears.

The synchronizer 6 is disposed on the output shaft 24, the driving gear (e.g. the output gear 51) of the main reducer may rotate differentially relative to the output shaft 24, while the engagement gear ring 52 configured to the synchronizer 6 is fixed at a left side of the driving gear of the main reducer. The driving gear of the main reducer is externally configured to mesh with the driven gear 53 of the main reducer, and the driven gear 53 of the main reducer may be fixed on the differential 54, to transfer the power to the differential 54. The differential 54 distributes the power and adaptively transfers the distributed power to half axles on two sides of the vehicle, to drive the wheels 200.

Two second motor generators 42 constitute wheel-side motors configured to drive two front wheels 210 respectively, and two second motor generators 43 constitute wheel-side motors configured to drive two rear wheels 220 respectively. That is, each of the four wheels is provided with one wheel-side motor.

With the power transmission system 100 in this example, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the main reducer and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two second motor generators 43 are wheel-side motors, and may directly drive two rear wheels 220 respectively.

The power transmission system 100 in this example may have at least the following operating conditions: a pure EV (electric vehicle) operating condition of the second motor generator 43, a pure EV four-wheel drive operating condition, a parallel operating condition, a series operating condition, a hybrid operating condition, and a braking/decelerating feedback operating condition.

First Operating Condition

This operating condition is a pure EV operating condition of the second motor generator 43. The dual clutch 31 is in a disengaged state, the synchronizer 6 is in a disengaged state, the engine unit 1, the first motor generator 41 and the second motor generator 42 do not operate, and two second motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the second motor generators 43 directly drive the rear wheels 220, compared to a front-wheel drive vehicle, the vehicle in this example has better acceleration performance, gradeability and steering capability. Moreover, since the second motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two second motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and 43 drive four wheels independently, the wheels may obtain different torques and rotating speeds, so as to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the main reducer via the shift gear set and the synchronizer 6, and the driving gear 51 of the main reducer transfers the power to the front wheels 210 via the differential 54, while two second motor generators 42 transfer the power to the corresponding front wheels 210 and two second motor generators 43 transfer the power to the corresponding rear wheels 220. This operating condition is mainly applicable to a situation where a load is the largest, for example, during quick acceleration, or climbing steep slopes.

This operating condition has the advantages that motor generators (e.g. 42 and 43) and the engine unit 1 drive the vehicle simultaneously, thus maximizing the dynamic performance. Compared to a front-wheel drive vehicle and a rear-wheel drive vehicle, a Hybrid Electric Vehicle (HEV) four-wheel drive vehicle has better acceleration performance, gradeability, handling performance and off-road capability. Moreover, since the second motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the second motor generators 43 are configured to drive the rear wheels 220 respectively. This operating condition is mainly applicable to a situation where a load is medium and an electric quantity of a battery is small.

This operating condition has the advantages that, when compared to a front-wheel drive vehicle and a rear-wheel drive vehicle, the vehicle under the series (i.e. four-wheel drive series) operating condition has better acceleration performance, gradeability, handling performance and off-road capability. Since two second motor generators 42 and 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the second motor generators 43 brake the rear wheels 220 and generate electricity. This operating condition is mainly used for braking or decelerating the vehicle.

This operating condition has the advantages that, since the second motor generators 42 and 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the main reducer via the shift gear set and the synchronizer 6, the second motor generators 42 drive the front wheels 210 directly via the driving gear 51 of the main reducer, and the second motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic property of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear of the main reducer as a target speed through the rotating speed control, so as to match the rotating speed of the output shaft 24 with the rotating speed of the driving gear of the main reducer as far as possible, thus facilitating the engagement of the synchronizer 6.

During the matching, the second motor generators 42 and 43 may respond to the needs of the driver to increase the torque, such that the vehicle is accelerated, unlike a vehicle in the related art, the vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 and 43 may meet the braking feedback requirements, and the feedback of the first motor generator 41 is not needed. At this time, the second motor generators 42 and 43 may respond to the needs of the driver to brake the wheels and feed back the electric quantity, unlike a vehicle in the related art, the vehicle does not require the synchronizer 6 to be in an engaged state to feed back the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the main reducer along with the speed of the vehicle may not be controllable, the speed adjusting accuracy and rate of the first motor generator 41 may be reduced. Under such road conditions, since the second motor generators 42 and 43 may compensate for the torque of the vehicle, the speed of the vehicle may be stabilized effectively, thus improving the driving experience of the vehicle and simplifying the engagement of the synchronizer 6.

Example 2

As shown in FIG. 3, the power transmission system 100 in this example differs from the power transmission system 100 shown in FIG. 2 in the arrangement of the second motor generators 43. In this example, each second motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that the power transfer between the second motor generators 43 and the corresponding rear wheels 220 is performed via the second speed changing mechanism 72, which will not be detailed here.

Example 3

As shown in FIG. 4, the power transmission system 100 in this example differs from the power transmission system 100 shown in FIG. 2 in the arrangement of the second motor generators 43. In this example, one second motor generator 43 is provided and drives the rear wheels 220 via one first speed changing mechanism 71. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that since two rear wheels 220 are driven by one second motor generator 43 and one first speed changing mechanism 71, in the premise of no new components, the differential rotation of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Example 4

As shown in FIG. 5, the power transmission system 100 in this example differs from the power transmission system 100 shown in FIG. 2 in the arrangement of the second motor generators 42. In this example, the second motor generators 42 are disposed at two sides of the differential 54 back to back respectively. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

Example 5

As shown in FIG. 6, the power transmission system 100 in this example differs from the power transmission system 100 shown in FIG. 5 in the arrangement of the second motor generators 43. In this example, each second motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

Example 6

As shown in FIG. 7, the power transmission system 100 in this example differs from the power transmission system 100 shown in FIG. 5 in the arrangement of the second motor generators 43. In this example, one second motor generator 43 is provided and drives the rear wheels 220 via one first speed changing mechanism 71. Other parts in this example are substantially the same as those in the power transmission system 100 shown in FIG. 5, so the detailed description thereof will be omitted here. The operating conditions of the power transmission system 100 in this example are substantially the same as those of the power transmission system 100 shown in FIG. 5, except that since two rear wheels 220 are driven by one second motor generator 43 and one first speed changing mechanism 71, in the premise of no new components, the differential rotation of the rear wheels 220 may not be realized by means of only one motor and one speed changing mechanism, however, it would be appreciated that a differential integrally formed with the first speed changing mechanism 71 may be added to realize the differential rotation of the two rear wheels 220.

Example 7

As shown in FIG. 8, the power transmission system 100 in this example differs from the power transmission system 100 shown in FIG. 2 in the type of the clutch as well as the number of the input shafts, the driving gears 25 and the driven gears 26. In this example, the clutch is a triple clutch 32, three input shafts are provided, and correspondingly three pairs of driving gears 25 and driven gears 26 are provided. Other parts in this example are substantially the same as those in the power transmission system 100 shown in FIG. 2, so the detailed description thereof will be omitted here.

Example 8

As shown in FIG. 9, the power transmission system 100 in this example differs from the power transmission system 100 shown in FIG. 2 in that the second motor generators 43 in the example shown in FIG. 2 are eliminated, and the power transmission system 100 in this example is in a two-wheel drive mode.

The power transmission system 100 in this example may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components is the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the main reducer via the shift gear set and the synchronizer 6, and the driving gear 51 of the main reducer evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the main reducer via the shift gear set and the synchronizer 6, the driving gear 51 of the main reducer evenly distributes the power to the left and right front wheels 210 via the differential 54, and the second motor generators 42 directly drive the left and right front wheels 210. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the front wheels 210. This operating condition is mainly applicable to a situation where a load is medium and an electric quantity of a battery is small.

This operating condition has the advantages that, since the second motor generators 42 directly drive the front wheels 210, the transmission chain is the shortest, and operating components is the fewest, thus achieving maximum transmission efficiency and minimum noise.

Meanwhile, the first motor generator 41 may keep the engine unit 1 running in an optimal economic region through the torque and speed control, thus reducing fuel consumption during the electricity generation. Moreover, since the second motor generators 42 independently drive the left front wheel 210 and the right front wheel 210 respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generator 42 directly brake the front wheels 210 and generate electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, so as to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear 51 of the main reducer as a target speed through the rotating speed control, so as to match the rotating speed of the output shaft 24 with the rotating speed of the driving gear 51 of the main reducer as far as possible, thus facilitating the engagement of the synchronizer 6.

During the matching, the second motor generators 42 may respond to the needs of the driver to increase the torque, such that the vehicle is accelerated, unlike a vehicle in the related art, which is accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may respond to the needs of the driver to brake the wheels and feed back the electric quantity, unlike a vehicle in the related art, the vehicle does not require the synchronizer 6 to be in an engaged state to feed back the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 can be difficult due to the instability of the speed of the vehicle. Even if the first motor generator 41 may adjust the rotating speed of the output shaft 24 through the rotating speed control, since the rotating speed of the driving gear of the main reducer along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

Example 9

As shown in FIG. 10, the power transmission system 100 in this example differs from the power transmission system 100 shown in FIG. 9 in the arrangement of the second motor generators 42. In this example, the second motor generators 42 are disposed at two sides of the differential 54 back to back respectively. Other parts in this example are substantially the same as those in the power transmission system 100 shown in FIG. 9, so the detailed description thereof will be omitted here.

Example 10

As shown in FIG. 11, the power transmission system 100 in this example differs from the power transmission system 100 shown in FIG. 9 in the arrangement of the second motor generators 42. In this example, two second motor generators 42 are provided, and each second motor generator 42 drives a corresponding rear wheel 220 via one fourth speed changing mechanism 74. Other parts in this example are substantially the same as those in the power transmission system 100 shown in FIG. 9, so the detailed description thereof will be omitted here.

The power transmission system 100 in this example may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel 220 via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels 220, compared to a front-wheel drive vehicle, the vehicle in this example has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in an engaged state, the engine unit 1 does not operate, the first motor generator 41 drives the front wheels 210 respectively, and the second motor generators 42 drive the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Third Operating Condition

This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels 220 respectively. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV (Hybrid Electric Vehicle) four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels 220 respectively. This operating condition is mainly applicable to a situation where a load is medium and an electric quantity of a battery is small. This operating condition has the advantages that, since the two second motor generators 42 independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in a disengaged state, the synchronizer 6 is in an engaged state, the engine unit 1 does not operate, and the first motor generator 41 and the second motor generators 42 brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators 42 may control the braking force independently, thus improving the handling stability of the vehicle during braking when turning, and further increasing the feedback energy.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

Example 11

As shown in FIG. 12, the power transmission system 100 in this example differs from the power transmission system 100 shown in FIG. 9 in the arrangement of the second motor generators 42. In this example, one second motor generators 42 is provided, and the second motor generator 42 drives the rear wheels 220 via one third speed changing mechanism 73. Other parts in this example are substantially the same as those in the power transmission system 100 shown in FIG. 9, so the detailed description thereof will be omitted here.

In this example, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this example has better acceleration performance, gradeability and steering capability. In a front-wheel drive part, since the association between the output gear 51 and the front wheels 210 is interrupted by the synchronizer 6, there is no mechanical loss in the front-wheel drive part, thus reducing the energy consumption of the vehicle. In a rear-wheel drive part, a differential integrally formed with the third speed changing mechanism 73 may also be provided.

In this example, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drive the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this example, the power transmission system 100 may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drive the rear wheels 220. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV (Hybrid Electric Vehicle) four-wheel drive vehicle has better acceleration performance, gradeability, handling performance and off-road capability.

In this example, the power transmission system 100 may also have a series operating condition. The dual clutch 31 is in an engaged state, the synchronizer 6 is in a disengaged state, the engine unit 1 drives the first motor generator 41 to generate electricity, and the second motor generator 42 drive the rear wheels 220. This operating condition is mainly applicable to a situation where a load is medium and an electric quantity of a battery is small. This operating condition has the advantages that compared to a front-wheel drive vehicle, the vehicle under the series operating condition has better acceleration performance, gradeability, handling performance and steering capability. Moreover, the first motor generator 41 may keep the engine unit 1 running in an optimal economic region through the torque and speed control, thus reducing fuel consumption during the electricity generation.

In this example, the power transmission system 100 may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

Example 12

As shown in FIG. 13, the power transmission system 100 in this example differs from the power transmission system 100 shown in FIG. 9 in the arrangement of the second motor generators 42. In this example, two second motor generators 42 are provided and are wheel-side motors, and each second motor generator 42 drives a corresponding rear wheel 220. The power transmission manner in this example is similar to that shown in FIG. 11, and other parts in this example are substantially the same as those in the power transmission system 100 shown in FIG. 9, so the detailed description thereof will be omitted here.

Example 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. Indirect power transmission between the output terminal of the first motor generator 41 and the second intermediate shaft gear 452 via an intermediate idler 44 is performed.

The synchronizer 6 is disposed on the output shaft 24 and configured to engage with the double-linked gear 26. The driving gear 51 of the main reducer is fixed on the output shaft 24. The driving gear 51 of the main reducer is configured to externally mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

Example 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. The output terminal of the first motor generator 41 is configured to directly mesh with the second intermediate shaft gear 452 for power transmission.

The synchronizer 6 is disposed on the output shaft 24 and configured to engage with the double-linked gear 26. The driving gear 51 of the main reducer is fixed on the output shaft 24. The driving gear 51 of the main reducer is configured to externally mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

Example 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22. The output terminal of the first motor generator 41 is configured to directly mesh with the first gear part 261 for power transmission.

The synchronizer 6 is disposed on the output shaft 24 and configured to engage with the double-linked gear 26. The driving gear 51 of the main reducer is fixed on the output shaft 24. The driving gear 51 of the main reducer is configured to externally mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

Example 16

As shown in FIG. 17, the power transmission system 100 in this example differs from the power transmission system 100 shown in FIG. 14 in that the clutch 9 is provided instead of the synchronizer 6 of the power transmission system 100 in FIG. 14, and the driving gear 51 of the main reducer is fixed on the output shaft 24.

Example 17

As shown in FIG. 18, the power transmission system 100 in this example differs from the power transmission system 100 shown in FIG. 15 in that the clutch 9 is provided instead of the synchronizer 6 of the power transmission system 100 in FIG. 15, and the driving gear 51 of the main reducer is fixed on the output shaft 24.

Example 18

As shown in FIG. 19, the power transmission system 100 in this example differs from the power transmission system 100 shown in FIG. 16 in that the clutch 9 is provided instead of the synchronizer 6 of the power transmission system 100 in FIG. 16, and the driving gear 51 of the main reducer is fixed on the output shaft 24.

It should be noted that, as shown in FIGS. 14-19, in a variation of the linked gear 26, the power transmission system 100 may further include at least one of the second motor generators 42 and 43 (not shown in FIGS. 14-19), and the arrangement of at least one of the second motor generators 42 and 43 may be the same as that in FIGS. 2-13, for example, being in a wheel-side form, or being disposed at two sides of the differential back to back. For example, alternatively, the driving gear 51 of the main reducer of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

Embodiments of the present disclosure further provide a vehicle including the abovementioned power transmission system 100. Based on the abovementioned power transmission system of the vehicle, a method for controlling a synchronizer of a vehicle according to embodiments of the present disclosure will be described in detail below.

The vehicle includes an engine unit, a transmission unit configured to selectively couple with the engine unit, an output unit configured to transfer a power transmitted by the transmission unit to at least one of front and rear wheels of the vehicle, a synchronizer configured to enable or interrupt a power transmission between the transmission unit and the output unit and to selectively synchronize the output unit and the transmission unit, a first motor generator coupled with the transmission unit and configured to adjust a rotating speed of an output shaft coupled with the synchronizer according to a speed of the vehicle, a second motor generator configured to drive at least one of the front and rear wheels, and a power battery coupled with the first and second motor generators respectively. The method for controlling the synchronizer of the vehicle includes: acquiring an operation mode and operation parameters of the vehicle; and controlling the synchronizer to engage or disengage based on the operation parameters.

The power output by engine unit and/or the first motor generator may be output from the output unit by the engagement of the synchronizer, thus the vehicle may be compact in structure and the vehicle is convenient to control by using the method according to embodiments of the present disclosure. In addition, during the switching of operation modes of the vehicle, it is possible that the synchronizer switches from being engaged to being disengaged. Then a rotating speed of the output shaft may be adjusted by controlling the rotating speed of the output unit, thus matching rotating speeds of the output unit and the output shaft within a short time and facilitating the engagement of the synchronizer. Therefore the transmission system performance may be significantly improved, and the power loss during the transmission may be reduced. Further, with the precise control of engagement and disengagement of the synchronizer, the vehicle may run smoothly and stably with the method according to embodiments of the present disclosure. Therefore, the stability and smooth of the vehicle may be achieved. In addition, the noise and impact during the engage/disengage of the synchronizer may be reduced, and thus the life of the transmission unit may be increased.

Figure 20:
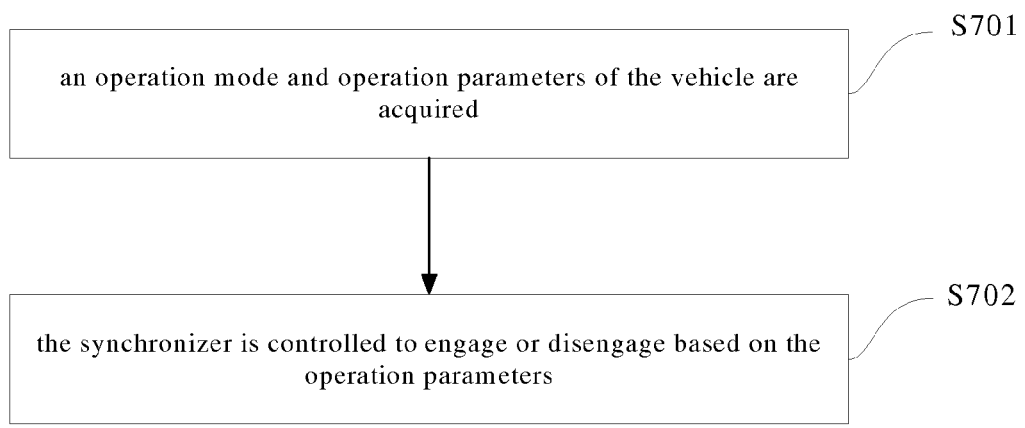
FIG. 20 is a flow chart illustrating an exemplary method for controlling a synchronizer of a vehicle according to an embodiment of the present disclosure.

As shown in FIG. 20, the method for controlling the synchronizer of the vehicle includes the following steps:

At step S701, an operation mode and operation parameters of the vehicle are acquired.

In some embodiments, the transmission unit includes a transmission power input part and a transmission power output part, and the transmission power input part includes a first input shaft and a second input shaft fitted over the first input shaft. The vehicle further include a dual clutch comprising an input terminal coupled with the engine unit, a first output terminal coupled with the first input shaft, and a second output terminal coupled with the second input shaft.

In some embodiments, the operation mode of the vehicle includes an EV (Electric Vehicle) mode and a HEV (Hybrid Electric Vehicle) mode. In some embodiments, the operation modes can be subdivided into four types, i.e. an EV economic mode, an EV sport mode, a HEV (Hybrid Electric Vehicle) economic mode and a HEV (Hybrid Electric Vehicle) sport mode. In some embodiments, the operation modes can be subdivided into three sub-types, i.e. the front-wheel drive mode, the rear-wheel drive mode, and the four-wheel drive mode.

In some embodiments, the HEV mode comprises a series mode, a parallel mode and a series-parallel mode. In some embodiments, each of the EV mode and a HEV mode includes a front-wheel drive mode, a rear-wheel drive mode, and a four-wheel drive mode.

In the EV mode, if the power requirement of the vehicle is relatively low, the vehicle is driven by the second motor generator independently; and if the power requirement of the vehicle is relatively high, the vehicle is driven by the first and second motor generators.

In the series mode, the engine unit drives the first motor generator to generate electric energy, and the vehicle is driven by the second motor generator. The electric power generated by the first motor generator is supplied to the second motor generator or stored in the power battery.

In the parallel mode, the vehicle is driven by the engine unit and the motor generators (first and/or second motor generators). If the power requirement of the vehicle is relatively low, the vehicle can be driven by the first and/or second motor generators; and if the power requirement of the vehicle is moderate, the vehicle is driven by the engine unit independently, in which the surplus power of the engine unit may be converted to electric energy by the first motor generator and stored in the power battery; if the power requirement of the vehicle is high, the vehicle is driven by the engine unit and the first and/or second motor generators.

The series-parallel mode is the combination of the series mode and parallel mode.

In the rear-wheel drive mode, the vehicle is driven by the second motor generator independently, and the first motor generator and the engine unit either stop working or are used to generate electric energy corporately.

In the front-wheel drive mode, the vehicle is driven by the engine unit, the first motor generator, or combinations of the two.

In the four wheel-drive operation mode, the vehicle is driven by the first and second motor generators.

In some embodiments, the operation parameters of the vehicle include at least one of an electric quantity of the power battery, the speed of the vehicle, a required power of the vehicle, a required torque of the vehicle, a slipping condition of the front wheel of the vehicle, a slipping condition of the rear wheel of the vehicle, and an electric braking torque of the vehicle.

At step S702, the synchronizer is controlled to engage or disengage based on the operation parameters. In other words, the vehicle is controlled to switch between different operation modes based on the operation parameters, and the synchronizer is controlled to work stably. The first motor generator is configured to adjust a rotating speed of an output shaft coupled with the synchronizer. Therefore, the difference in rotating speeds of two sides (motor side and wheel side) of the synchronizer can be controlled within a certain range, thus ensuring the engage of the synchronizer and the smooth of the vehicle.

In some embodiments, the synchronizer may be controlled to engage in the following conditions.

In some embodiments, when the speed of the vehicle exceeds a speed threshold of the vehicle, the synchronizer is controlled to engage.

In some embodiments, when the vehicle is in the parallel mode or the series-parallel mode, the synchronizer is controlled to engage.

In some embodiments, when the electric quantity of the power battery is smaller than or equal to an electric quantity threshold, the synchronizer is controlled to engage.

In some embodiments, when the front wheel and/or rear wheel of the vehicle is detected to be in a slipping condition, the synchronizer is controlled to engage.

In some embodiments, when the electric braking torque of the vehicle is larger than a motor-feedback torque threshold of the vehicle, the synchronizer is controlled to engage.

In some embodiments, when the required torque of the vehicle is larger than a motor-feedback torque threshold of the second motor generator, the synchronizer is controlled to engage.

In some embodiments, when 1) the vehicle is in the EV mode, 2) the speed of the vehicle is lower than or equal to the speed threshold of the vehicle, and 3) the required torque of the vehicle is smaller than or equal to the torque threshold of the second motor generator, the synchronizer is controlled to disengage.

In some embodiments, when 1) the vehicle is in the HEV mode, 2) the speed of the vehicle is lower than or equal to the speed threshold of the vehicle, 3) the required torque of the vehicle is smaller than or equal to the torque threshold of the second motor generator, and 4) the electric quantity of the power battery is larger than the electric quantity threshold, the synchronizer is controlled to disengage.

In some embodiments, when the requirement for the torque or power of the vehicle is relatively low, for example, said torque is smaller than the torque threshold of the second motor generator, the vehicle is driven by the second motor generator entirely. If the electric quantity of the power battery is smaller than the electric quantity threshold P1, the engine unit drives the first motor generator to generate electric energy and supply the electric energy to the second motor generator. If there is remaining electric energy, the remaining electric energy can be stored in the power battery, and the synchronizer is controlled to disengage. If the speed of the vehicle is greater than the speed threshold V1 of the vehicle, or if the electric quantity of the power battery is smaller than the electric quantity threshold P1, the synchronizer is controlled to engage.

In some embodiments, if the required torque/power of the vehicle is larger than the torque threshold of the second motor generator, the vehicle is driven by the engine unit entirely. The first motor generator works accordingly, and the second motor generator does not work. If the electric quantity of the power battery is smaller than the electric quantity threshold, the first motor generator is driven by the surplus power of the engine unit and generates electric energy to charge the power battery. When the required torque/power of the vehicle exceeds a power limit of the engine unit, i.e. the maximum torque/power output by the engine unit, the vehicle is driven by the engine unit together with the second motor generator, and the synchronizer is controlled to engage.

In some embodiments, when the required torque/power of the vehicle is larger, the vehicle is driven by the engine unit together with the first and second motor generators. If the electric quantity of the power battery is insufficient, i.e. smaller than the electric quantity threshold, the engine unit drives the first motor generator to generate electric energy with a part of output power of the engine unit, and the first motor generator supplies the electric energy to the second motor generator and enables the second motor generator to work, thus implementing a large torque function of the second motor generator and controlling the synchronizer to engage.

In some embodiments, when the vehicle is running on a road with low adhesion or on a slope, and with at least one of the front and rear wheels detected to be in a slipping condition, a distribution of power among the front and rear wheels is performed, and each wheel may have maximum adhesion onto the road. When the rear wheel detected to be in a slipping condition, the current operation mode can be switched to the front-wheel drive mode and the vehicle is driven by the front wheels. Based on the rotating speed of the front wheels, the rotating speed of the front wheels is reduced and the torque of the front wheels is limited by the second motor generator, and the synchronizer is controlled to engage. When the front wheels are detected to be in a slipping condition, the current operation mode is switched to the rear-wheel drive mode and the vehicle is driven by the rear wheels. Based on the rotating speed of the rear wheels, the rotating speed of the rear wheels is reduced and the torque of the rear wheels is limited by the second motor generator, and the synchronizer is controlled to engage. Therefore, the stability and smooth operation of the vehicle can be enhanced.

In some embodiments, when the speed of the vehicle is reducing, the energy can be fed back according to conditions of the throttle pedal and the braking pedal, and the feedback ratio is reasonably distributed based on the power requirement and the adhesion ratio of the wheels, thus optimizing the energy recovery control. If the braking toque of the second motor generator exceeds the motor-feedback torque threshold T1 of the second motor generator, the synchronizer is controlled to engage. And then the first motor generator performs the energy feedback with the assistance of the second motor generator.

When the speed of the vehicle is relatively low, the vehicle may run mainly in the series mode. If the rotating speed of the engine unit is relatively low and the economy of the operation period is relatively poor, the vehicle is driven by the second motor generator independently. If the required torque/power of the vehicle increases, the vehicle is driven by the first and second motor generators. If the electric quantity of the power battery is smaller than the electric quantity threshold P1, the engine unit drives the first motor generator to generate electric energy, the first motor generator supplies the electric energy to the second motor generator, and the synchronizer is disengaged. If the speed of the vehicle exceeds the speed threshold V1 of the vehicle, or if the electric quantity of the power battery is smaller than the electric quantity threshold P1, the synchronizer is engaged.

When the speed of the vehicle is relatively high, the vehicle may mainly run in the parallel mode. The vehicle may be driven by the engine unit entirely or jointly by the engine unit, and the first and second motor generators. If the electric quantity of the power battery is smaller than the electric quantity threshold P1, the engine unit drives the first motor generator to generate electric energy via a part of output power of the engine unit. The electric energy is supplied to the second motor generator, by which the maximum torque function of the second motor generator may be achieved, and the synchronizer is controlled to engage.

When the speed of the vehicle is higher, the vehicle may mainly run in the series-parallel mode, and the vehicle is driven by the first and second motor generators. The engine unit drives the first motor generator to generate electric energy with a part of output power of the engine unit, and the generated electric energy is then supplied to the second motor generator, and the synchronizer is engaged. The series-parallel mode utilizes the advantages of both the series and parallel modes, while optimizing the matching of rotation speed among the engine unit and the first and second motor generators. Therefore, the vehicle may run in optimized condition, which reduces the fuel consumption and gas emissions of the vehicle.

An exemplary method for controlling the synchronizer of the vehicle according to embodiments of the present disclosure will be described in detail.

In some embodiments, controlling the synchronizer to engage includes the following three conditions.

In a first condition, the first motor generator is controlled to switch from a torque control manner to a rotating speed control manner with a rotating speed of a wheel side in the synchronizer as a target rotating speed of the rotating speed control manner.

In a second condition, the synchronizer is controlled to engage when a rotating speed of the first motor generator is close to the target rotating speed. At the moment of the engagement of the synchronizer, the first motor generator is switched from the torque control manner to the rotating speed control manner. The rotating speed control manner may obtain a rotating speed of an output shaft of the motor via a rotating speed of driven end of the synchronizer. After the synchronizer is engaged successfully, the first motor generator is switched back to the toque control manner, and generates electric quantity or output torque to drive the vehicle. It is well known in the engineering field that the precision required for controlling the speed of the motor is generally not so high (which is substantially smaller than 5%), and can be matched and calculated from a rotating speed difference of driven and driving members of the synchronizer.

In a third condition, after the synchronizer is controlled to engage, the first motor generator is controlled to switch from the rotating speed control manner to the torque control manner.

During the process of engaging the synchronizer, the rotating speed difference of the driven and driving members must be controlled within a certain range, to ensure the synchronizer to engage rapidly and smoothly without any impact. When the synchronizer is engaged, the first motor generator is switched from the torque control manner to the rotating speed control manner. The rotating speed control manner may obtain the target rotating speed via the rotating speed of the wheel side of the synchronizer. Generally, the precision for controlling speed adjusting of the motor generator may be smaller than a certain value (for example, 5%), and matched and calculated according to the rotating speed difference of driven and driving members of the synchronizer. The rotating speed of the first motor generator shall not exceed a rotation speed threshold n1 (for example, 3000 rpm), and the speed of the vehicle shall not exceed a speed threshold V1 (for example, 40 km/h). When the speed of the vehicle reaches V1, the synchronizer needs to be engaged for the purpose of ensuring various combining functions of the synchronizer, and the first motor generator rotates with the rotation of the wheels or drives the vehicle to run. When the synchronizer is engaged successfully, the first motor generator is switched back to the torque control manner.

In some embodiments, when the vehicle is in the rear-wheel drive mode and the speed of the vehicle is equal to the speed threshold V1 of the vehicle, the synchronizer is in a disengaged state according to requirements of the power train system. When the speed of the vehicle exceeds the speed threshold V1, the synchronizer is engaged firstly, and then the first motor generator rotates with the rotation of the wheels.

The condition for engaging the synchronizer may include: the speed of the vehicle exceeds the speed threshold V1, and the front wheel is involved in the driving of the vehicle or in the braking of the vehicle when operating in, for example, front-wheel drive mode or four-wheel drive mode.

The condition for disengaging the synchronizer may include: the vehicle is in the rear-wheel drive mode or in the braking mode. When the speed of the vehicle is lower than the speed threshold V1 and the power train system requires the rear wheels to independently drive the vehicle to run (or the rear wheels involve independently in the braking of the vehicle) or to brake.

In some embodiments, as shown in FIG. 2, when the vehicle is working in the series mode, the second output terminal 312 is connected to the engine unit 1 via the dual clutch 31, so as to drive the first motor generator 41 to generate electric energy and supply the electric energy to the second motor generator 42.

When the vehicle is working in the parallel mode, the first output terminal 311 or the second output terminal 312 is connected to the engine unit 1 via the dual clutch 31, so as to transmit the power to the wheels via the synchronizer 6, and the first motor generator 41 transmits the power to the wheels via the synchronizer 6.

When the vehicle is working in the series-parallel mode, the engine unit 1 drives the wheels with a power transmission manner the same as that in the parallel mode, and the remaining output power of the engine unit 1 is transmitted to the first motor generator 41 with a power transmission manner the same as that in the series mode. Thereby the first motor generator 41 generates electric energy and supply the electric energy to the second motor generator 42.

Figure 21:
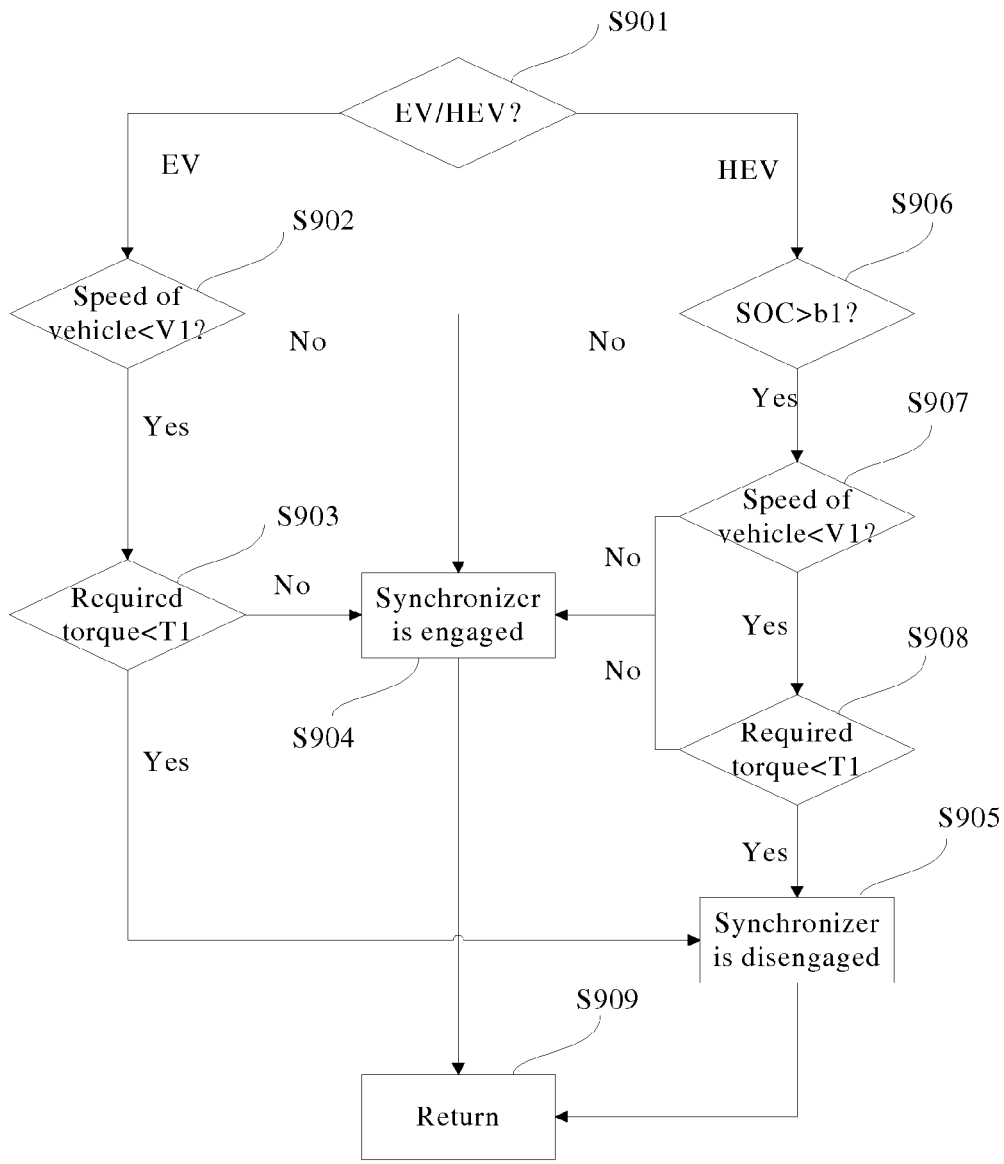
FIG. 21 is a flow chart illustrating an exemplary method for controlling the synchronizer of a vehicle according to an embodiment of the present disclosure.

FIG. 21 illustrates an exemplary method for controlling, for example synchronizer 6 of a vehicle as shown in FIG. 2, according to embodiments of the present disclosure.

At step S901, an operation mode of the vehicle is determined. If the current operation mode is EV mode, a step S902 is performed; otherwise, a step S906 is performed.

At step S902, it is determined whether the speed of the vehicle is lower than or equal to a speed threshold V1 for engaging or disengaging the synchronizer 6. If yes, a step S903 is performed; otherwise, a step S904 is performed.

At step S903, it is determined whether the required torque is smaller than or equal to a torque threshold T1 of the second motor generator, if yes, a step S905 is performed; otherwise, the step S904 is performed.

At step S904, the synchronizer is controlled to engage, and a step 909 is performed subsequently.

At step S905, the synchronizer is controlled to disengage, and the step 909 is performed subsequently.

At step S906, it is determined whether an electric quantity of the power battery is larger than an electric threshold b1, if yes, a step S907 is performed; otherwise, the step S904 is performed.

At step S907, it is determined whether the speed of the vehicle is smaller than or equal to the speed V1 of vehicle for engaging or disengaging the synchronizer 6. If yes, a step S908 is performed; otherwise, the step S904 is performed.

At step S908, it is determined whether the required torque of the vehicle is smaller than or equal to the torque threshold T1 of the second motor generator, if yes, the step S905 is performed; otherwise, the step S904 is performed.

At step S909, it is returned.

With the method according to embodiments of the present disclosure, various different operation modes may be formed by using three power sources, i.e., the engine unit, and the first and second motor generators, which may perform reasonable distribution of these power sources according to the power condition and economy of the vehicle, and ensure that the engine unit, and the first and second motor generators are working in good economic area in the condition that the power of the vehicle is ensured. In this way, the target for controlling gas emission and fuel consumption may be achieved. Further, functions such as ground clearance, redirection function, driving function, and all-weather function may be satisfied. During the running of the vehicle, with the precise control of engaging and disengaging the synchronizer, the vehicle may run smoothly and stably. Therefore, the stability and smooth operation of the vehicle may be achieved. In addition, the noise and impact during engaging/disengaging the synchronizer may be reduced, and the life of the transmission unit may be improved.

Figure 22:
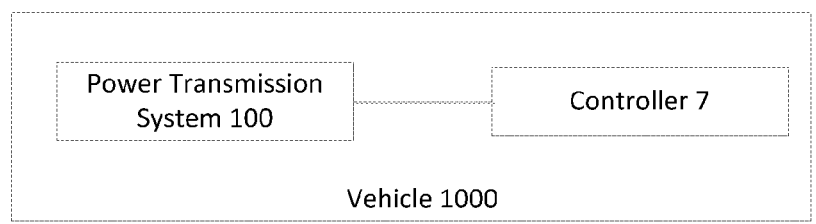
FIG. 22 is a block view illustrating an exemplary vehicle according to an embodiment of the present disclosure.

Embodiments of the present disclosure further provide a vehicle including the above-identified power transmission system 100. As shown in FIG. 22, the vehicle 1000 also includes a controller 7 configured to acquire an operation mode and operation parameters of the vehicle, and to control the synchronizer to engage or disengage based on the operation parameters. The vehicle according to embodiments of the present disclosure will be described below with reference to the drawings.

The vehicle according to embodiments of the present disclosure includes: an engine unit; a transmission unit configured to selectively couple with the engine unit; an output unit configured to transfer a power transmitted by the transmission unit to at least one of front and rear wheels of the vehicle; a synchronizer configured to enable or interrupt a power transmission between the transmission unit and the output unit and to selectively synchronize the output unit and the transmission unit; a first motor generator coupled with the transmission unit, and configured to adjust a rotating speed of an output shaft coupled with the synchronizer according to a speed of the vehicle; a second motor generator configured to drive at least one of the front and rear wheels of the vehicle; a power battery coupled with the first and second motor generators respectively; and a controller configured to acquire an operation mode and operation parameters of the vehicle, and to control the synchronizer to engage or disengage based on the operation parameters.

In some embodiments, the transmission unit includes a transmission power input part and a transmission power output part, and the transmission power input part includes a first input shaft and a second input shaft fitted over the first input shaft. The vehicle may further include a dual clutch comprising an input terminal coupled with the engine unit, a first output terminal coupled with the first input shaft, and a second output terminal coupled with the second input shaft.

In some embodiments, the operation mode of the vehicle includes an EV mode and a HEV mode. The HEV mode includes series mode, parallel mode, series-parallel mode. In some embodiments, each of the EV mode and a HEV mode includes a front-wheel drive mode, a rear-wheel drive mode, and a four-wheel drive mode.

In some embodiments, the operation parameters of the vehicle include at least one of an electric quantity of the power battery, the speed of the vehicle, a required power of the vehicle, a required torque of the vehicle, a slipping condition of the front wheel of the vehicle, a slipping condition of the rear wheel of the vehicle, and an electric braking torque of the vehicle.

In some embodiments, the controller is configured to control the synchronizer to engage when at least one of the following conditions is satisfied: the speed of the vehicle is larger than a speed threshold of the vehicle; the vehicle is the vehicle is in the parallel mode or the series-parallel mode; when the electric quantity of the power battery is smaller than or equal to an electric quantity threshold; at least one of the front and rear wheels of the vehicle is in the slipping condition; the electric braking torque of the vehicle is larger than a motor-feedback torque threshold of the second motor generator; or the required torque of the vehicle is larger than a torque threshold of the second motor generator.

In some embodiments, the controller is configured to control the synchronizer to disengage when at least one of the following conditions is satisfied: When 1) the vehicle is in the EV mode, 2) the speed of the vehicle is lower than or equal to a speed threshold of the vehicle, and 3) the required torque of the vehicle is smaller than or equal to a torque threshold of the second motor generator; Or when 1) the vehicle is in the HEV mode, the speed of the vehicle is lower than or equal to the speed threshold of the vehicle, the required torque of the vehicle is smaller than or equal to the torque threshold of the second motor generator, and the electric quantity of the power battery is larger than an electric quantity threshold.

In some embodiments, the controller is configured to control the synchronizer to engage in the following manners: controlling the first motor generator to switch from a torque control manner to a rotating speed control manner with a rotating speed of a wheel side in the synchronizer as a target rotating speed of the rotating speed control manner; and controlling the synchronizer to engage when a rotating speed of the first motor generator is close to the target rotating speed.

In some embodiments, the controller is further configured to control the first motor generator to switch from the rotating speed control manner to the torque control manner, after the controller controls the synchronizer to engage.

With the power transmission system of the vehicle according to embodiments of the present disclosure, the power output by at least one of the engine unit and the first motor generator may be output to the output unit via the synchronizer, and then output by the output unit to at least one of the front and rear wheels of the vehicle.

Meanwhile, by means of providing the second motor generator, the second motor generator may compensate for the torque of the front wheels or the rear wheels, and to cooperate with the engine unit and the first motor generator to drive the vehicle, thus increasing the number of operation modes of the vehicle. Therefore, the vehicle may be configured to different operating conditions, thus achieving better fuel economy and reducing emission of harmful gases. In addition, with the precise control of engaging and disengaging the synchronizer, the vehicle may run smoothly and stably with the method according to embodiments of the present disclosure. Therefore, the stability and smooth operation of the vehicle may be achieved. In addition, the noise and impact during the engagement/disengagement of the synchronizer may be reduced, and thus the life of the transmission unit may be increased.

It is appreciated that, other structures of the vehicle according to embodiments of the present disclosure, such as the running system, the redirection system, and the braking system, are both well known to those skilled in the art thus details thereof are omitted herein.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a synchronizer of a vehicle, the method comprising:
   acquiring an operation mode and operation parameters of the vehicle, the vehicle comprising:
      an engine unit,
      a transmission unit configured to be selectively coupled with the engine unit via a clutch, the transmission unit comprising at least a first input shaft and a second input shaft fitted over the first input shaft, a first and a second driving gears mounted on the first and second input shafts and rotating synchronously with the first and second input shafts, respectively, an output shaft, a first and a second driven gears mounted on the output shaft and rotating synchronously with the output shaft, the first and second driving gears on the first and second input shafts meshing with the first and second driven gears on the output shaft,
      an output unit configured to transmit power transmitted by the transmission unit to at least one of front and rear wheels of the vehicle,
      a synchronizer disposed on the output shaft of the transmission unit and configured to enable or interrupt power transmission between the transmission unit and the output unit and to selectively synchronize the output unit and the transmission unit,
      a first motor generator coupled with one of the first and second driving gears on the first and second input shafts of the transmission unit and configured to adjust a rotating speed of the output shaft coupled with the synchronizer according to a speed of the vehicle,
      a second motor generator configured to drive at least one of the front and rear wheels, and
      a power battery coupled with the first and second motor generators respectively; and
   controlling the synchronizer to engage or to disengage based on the operation parameters.

2. The method according to claim 1, wherein the operation mode of the vehicle comprises an EV mode and a HEV mode, and the HEV mode comprises a series mode, a parallel mode and a series-parallel mode.

3. The method according to claim 1, wherein the operation mode of the vehicle comprises an EV mode and a HEV mode, and each of the EV mode and a HEV mode comprises a front-wheel drive mode, a rear-wheel drive mode, and a four-wheel drive mode.

4. The method according to claim 1, wherein the operation parameters of the vehicle comprise at least one of an electric quantity of the power battery, the speed of the vehicle, a required power of the vehicle, a required torque of the vehicle, a slipping condition of the front wheel of the vehicle, a slipping condition of the rear wheel of the vehicle, or an electric braking torque of the vehicle.

5. The method according to claim 4, wherein controlling the synchronizer to engage or disengage based on the operation parameters comprises controlling the synchronizer to engage when at least one of the following conditions is satisfied:
   the speed of the vehicle is larger than a speed threshold of the vehicle; the vehicle is in the parallel mode or the series-parallel mode;
   the electric quantity of the power battery is smaller than or equal to an electric quantity threshold;
   at least one of the front and rear wheels of the vehicle is in the slipping condition;
   the electric braking torque of the vehicle is larger than a motor-feedback torque threshold of the second motor generator; or
   the required torque of the vehicle is larger than a torque threshold of the second motor generator.

6. The method according to claim 5, wherein controlling the synchronizer to engage or disengage based on the operation parameters further comprises controlling the synchronizer to disengage when at least one of the following conditions is satisfied:
   the vehicle is in the EV mode, and the speed of the vehicle is smaller than or equal to a speed threshold of the vehicle, and the required torque of the vehicle is smaller than or equal to a torque threshold of the second motor generator; or
   the vehicle is in the HEV mode, the speed of the vehicle is smaller than or equal to the speed threshold of the vehicle, the required torque of the vehicle is smaller than or equal to the torque threshold of the second motor generator, and the electric quantity of the power battery is larger than an electric quantity threshold.

7. The method according to claim 5, wherein controlling the synchronizer to engage comprises:
   controlling the first motor generator to switch from a torque control manner to a rotating speed control manner with a rotating speed of a wheel side of the synchronizer as a target rotating speed of the rotating speed control manner;
   adjust a rotating speed of the output shaft that is coupled to the synchronizer; and controlling the synchronizer to engage when a rotating speed of the output shaft is close to the target rotating speed.

8. The method according to claim 7, further comprising controlling the first motor generator to switch from the rotating speed control manner to the torque control manner, after controlling the synchronizer to engage.

9. A method for controlling a synchronizer of a vehicle, the method comprising:
acquiring information on operation parameters of the vehicle, the vehicle comprising an engine unit, a transmission unit configured to selectively couple, via a clutch, with the engine unit and to couple with at least one of a plurality of wheels of the vehicle, a synchronizer configured to adjust a power transmission between the transmission unit and the plurality of wheels, a first motor generator coupled with the transmission unit and a second motor generator configured to drive at least one of the plurality of wheels, the first motor generator being configured to adjust an output rotating speed of the synchronizer, and a power battery coupled with the first and second motor generators respectively wherein the transmission unit comprises at least a first input shaft and a second input shaft fitted over the first input shaft, a first and a second driving gears mounted on the first and second input shafts and rotating synchronously with the first and second input shafts, respectively, an output shaft, a first and a second driven gears mounted on the output shaft and rotating synchronously with the output shaft, the first and second driving gears on the first and second input shafts meshing with the first and second driven gears on the output shaft; and
controlling the synchronizer and the clutch based on the operation parameters,
wherein controlling the synchronizer and the clutch based on the operation parameters comprises
disengaging the synchronizer and keeping the clutch in a disengaged state when the following conditions are satisfied:
the vehicle is in an electric vehicle (EV) mode, and a speed of the vehicle is smaller than or equal to a speed threshold of the vehicle, and a required torque of the vehicle is smaller than or equal to a torque threshold of the second motor generator; or
disengaging the synchronizer and keeping the clutch in an engaged state when the following conditions are satisfied:
the vehicle is in a hybrid electric vehicle (HEV) mode, the speed of the vehicle is smaller than or equal to the speed threshold of the vehicle, the required torque of the vehicle is smaller than or equal to the torque threshold of the second motor generator, and an electric quantity of the power battery is larger than an electric quantity threshold of the vehicle.

10. The method according to claim 9, further comprising:
acquiring information on an operation mode of the vehicle; and
controlling the synchronizer and the clutch further based on the operation mode of the vehicle.

11. The method according to claim 10, wherein the operation mode of the vehicle comprises an EV mode and a HEV mode, wherein the HEV mode comprises a series mode, a parallel mode and a series-parallel mode.

12. The method according to claim 11, wherein each of the EV mode and the HEV mode comprises a front-wheel drive mode, a rear-wheel drive mode, and a four-wheel drive mode.

13. The method according to claim 12, wherein the operation parameters of the vehicle comprise at least one of: an electric quantity of a power battery configured to supply electric power to the vehicle, the speed of the vehicle, a required power of the vehicle, a required torque of the vehicle, a slipping condition of the front wheels of the vehicle, a slipping condition of the rear wheels of the vehicle, and an electric braking torque of the vehicle.

14. The method according to claim 13, wherein the synchronizer and the clutch are both engaged if:
the speed of the vehicle exceeds a speed threshold of the vehicle;
the vehicle is in the parallel mode or the series-parallel mode;
the electric quantity of the power battery is smaller than or equal to an electric quantity threshold;
at least one of wheels of the vehicle is in the slipping condition;
the electric braking torque of the vehicle is larger than a motor-feedback torque threshold of the second motor generator; or
the required torque of the vehicle is larger than a torque threshold of the second motor generator.

15. A vehicle, comprising:
an engine unit;
a plurality of wheels;
a transmission unit configured to selectively couple with the engine unit via a clutch, the transmission unit comprising at least a first input shaft and a second input shaft fitted over the first input shaft, a first driving gear mounted on the first input shaft, a second driving gear mounted on the second input shaft, an output shaft, a first and a second driven gears mounted on the output shaft, the first and second driving gears on the first and second input shafts meshing with the first and second driven gears on the output shaft;
an output unit configured to transmit a power transmitted by the transmission unit to at least one of the wheels of the vehicle;
a synchronizer disposed on the output shaft of the transmission unit and configured to adjust a power transmission between the transmission unit and the output unit;
a first motor generator coupled with one of the first and second driving gears on the first and second input shafts of the transmission unit and configured to adjust a rotating speed of the output shaft coupled to the synchronizer according to a speed of the vehicle;
a second motor generator configured to drive at least one of wheels of the vehicle;
a power battery coupled with the first and second motor generators respectively; and
a controller configured to acquire an operation mode and operation parameters of the vehicle, and to control the synchronizer to adjust the power transmission based on the operation parameters.

16. The vehicle according to claim 15,
wherein the clutch is a dual clutch comprising: an input terminal coupled with the engine unit;
a first output terminal coupled with the first input shaft of the transmission unit; and
a second output terminal coupled with the second input shaft of the transmission unit.

17. The vehicle according to claim 15, wherein the operation mode of the vehicle comprises an EV mode and a HEV mode, and the HEV mode includes at least one of: a series mode, a parallel mode, a series-parallel mode, a front-wheel drive mode, a rear-wheel drive mode, and a four-wheel drive mode; and wherein the EV mode includes a front-wheel drive mode, a rear-wheel drive mode, and a four-wheel drive mode.

18. The vehicle according to claim 17, wherein the operation parameters of the vehicle comprise at least one of an electric quantity of the power battery, the speed of the vehicle, a required power of the vehicle, a required torque of the vehicle, a slipping condition of the front wheel of the vehicle, a slipping condition of the rear wheel of the vehicle, and an electric braking torque of the vehicle.

19. The vehicle according to claim 18, wherein the controller is configured to control the synchronizer to enable the power transmission if:
the speed of the vehicle exceeds a speed threshold of the vehicle;
the vehicle is in the parallel mode or the series-parallel mode and the electric quantity of the power battery is smaller than or equal to an electric quantity threshold;
at least one of the wheels of the vehicle is in the slipping condition;
the electric braking torque of the vehicle is larger than a motor-feedback torque threshold of the second motor generator; or
the required torque of the vehicle is larger than a torque threshold of the second motor generator.

20. The method according to claim 1, further comprising a third input shaft fitted over the second input shaft, a third driving gear mounted on the third input shaft and rotating synchronously with the third input shaft, and a third driven gear mounted on the output shaft, wherein the first motor generator is coupled with one of the first, second, and third driving gears and configured to adjust the rotating speed of the output shaft coupled with the synchronizer according to the speed of the vehicle.

* * * * *